United States Patent
Nolan, Jr.

[15] 3,701,261
[45] Oct. 31, 1972

[54] APPARATUS FOR PROVIDING OFFSHORE INSTALLATION

[72] Inventor: Clyde E. Nolan, Jr., Houston, Tex.
[73] Assignee: Brown & Root, Inc., Houston, Tex.
[22] Filed: Feb. 8, 1971
[21] Appl. No.: 113,252

[52] U.S. Cl. .................. 61/72.3, 166/.5, 166/.6, 285/18, 285/24
[51] Int. Cl. .................. F16l 35/00, E21b 43/01
[58] Field of Search ........... 61/72.3, 72.1; 166/.5, .6; 285/24, 18

[56] References Cited

UNITED STATES PATENTS

| | | |
|---|---|---|
| 3,298,092 | 1/1967 | Dozier et al. ............61/72.3 X |
| 3,373,807 | 3/1968 | Fischer et al. ..........61/72.3 X |
| 3,517,520 | 6/1970 | Hammett....................61/72.3 |
| 3,595,312 | 7/1971 | Matthews, Jr. ..........61/72.3 X |
| 3,308,881 | 3/1967 | Chan et al. ...................166/.6 |

FOREIGN PATENTS OR APPLICATIONS 1,503,007      1967    France........................61/72.3

*Primary Examiner*—Jacob Shapiro
*Attorney*—Burns, Doane, Swecker & Mathis

[57] ABSTRACT

Method and apparatus for providing an offshore installation wherein a base means is positioned on a submerged surface, one or more pipelines drawn into socketed engagement with the base means, and divers manipulate misalignment accommodating coupling means to interconnect the socketed pipeline means with a submerged, fluid receiving or supplying riser means housed in a caisson means.

24 Claims, 25 Drawing Figures

PATENTED OCT 31 1972　3,701,261

CLYDE E. NOLAN, JR., INVENTOR

BY Burns, Doane, Swecker & Mathis

ATTORNEYS

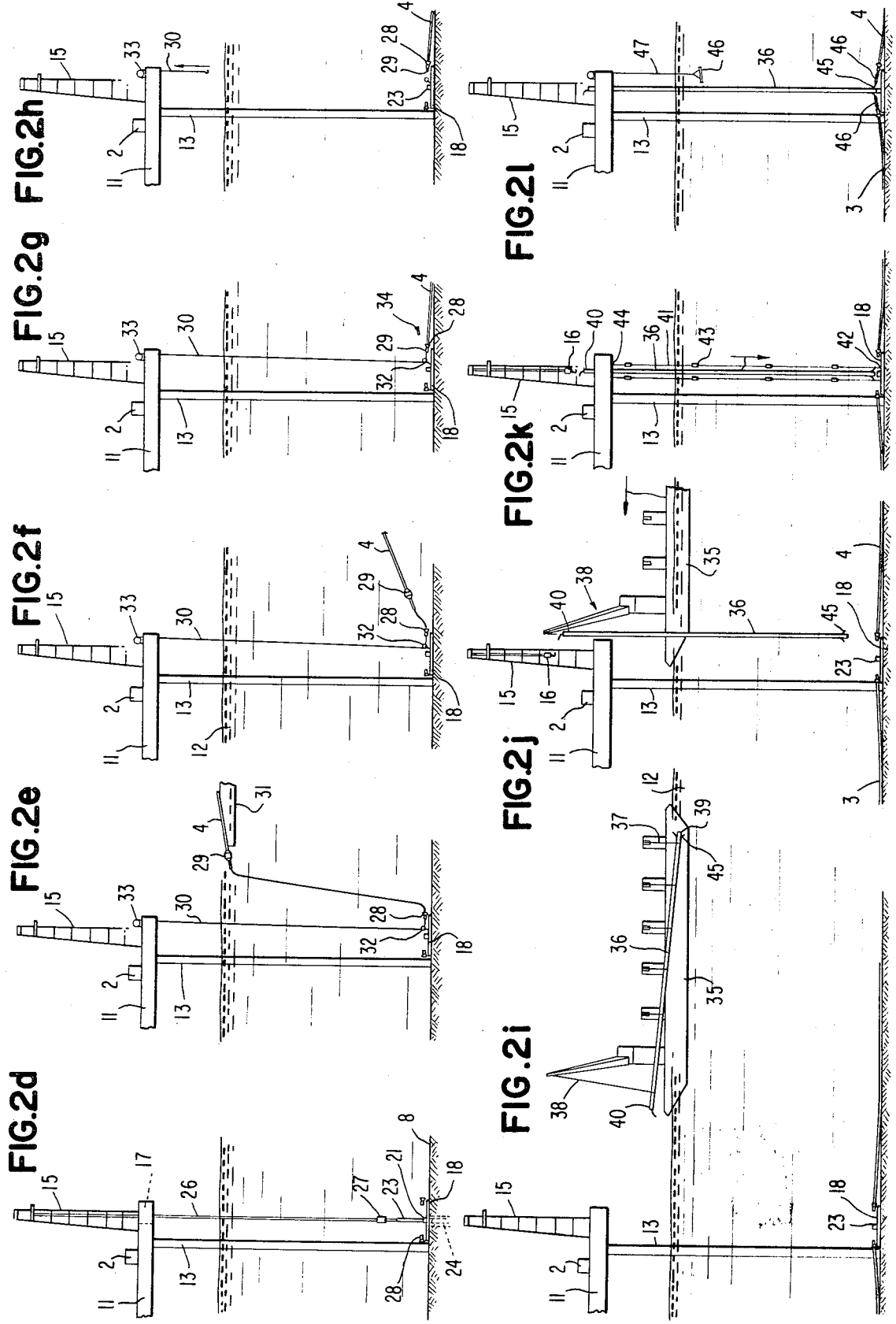

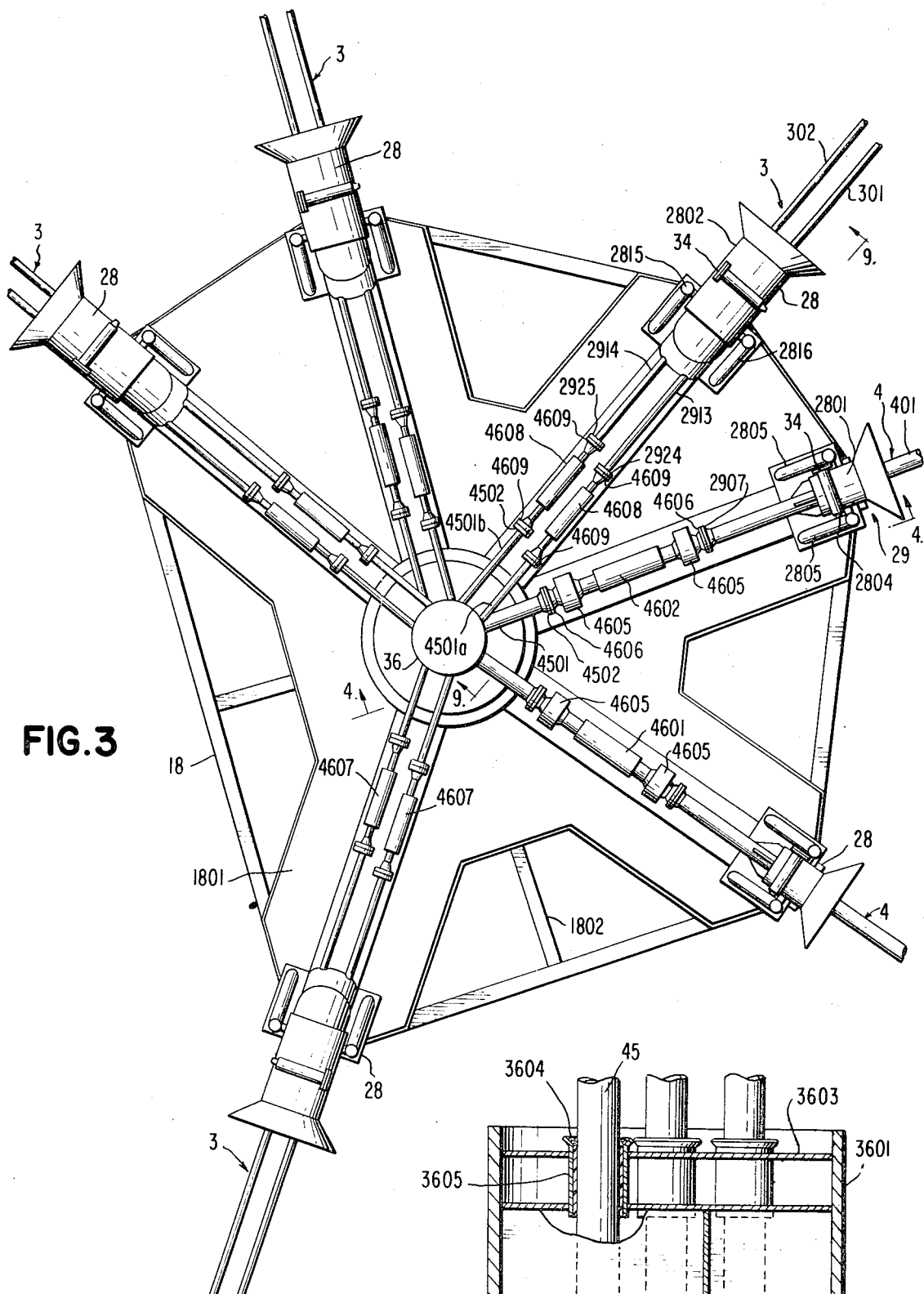

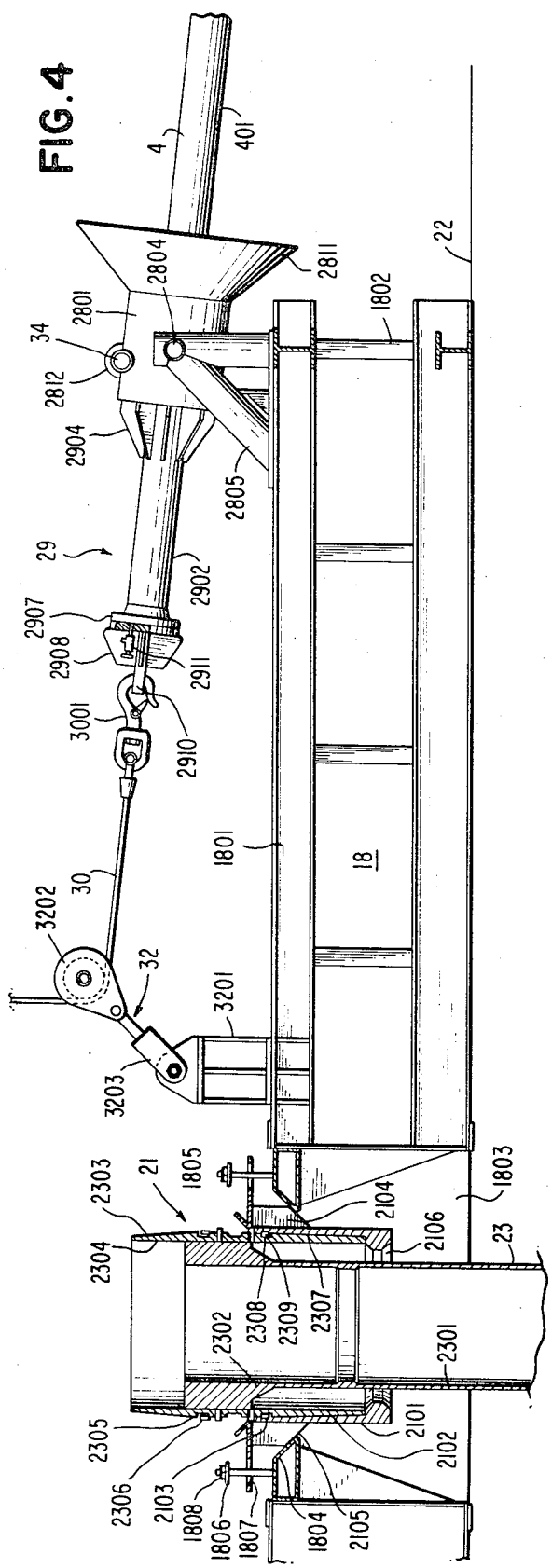

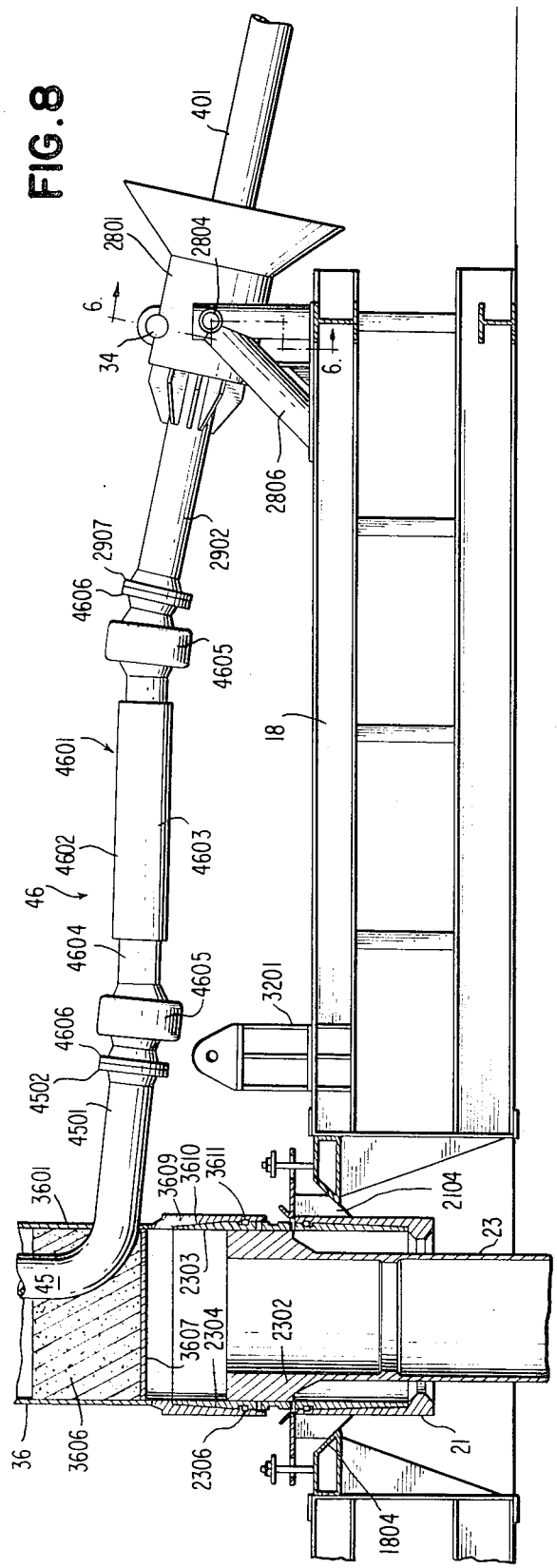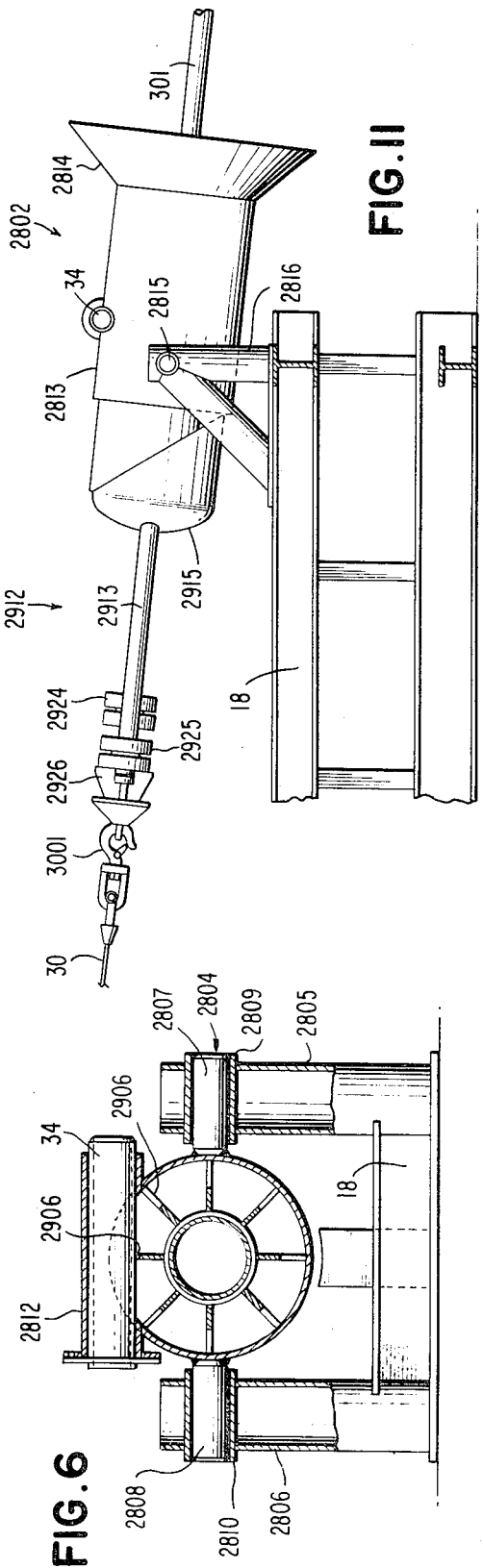

APPARATUS FOR PROVIDING OFFSHORE INSTALLATION

GENERAL BACKGROUND OF INVENTION

Throughout the past few decades the petroleum industry has expended a substantial effort with a view to developing installations for use in connection with offshore wells.

Petroleum operations, conducted offshore, are inherently vexatious because of frequently adverse weather conditions and because of the fundamental difficulties involved in fabricating structures, a portion or all of which is submerged.

In some instances practitioners in the offshore arts have suggested the utilization of buoyant installations exemplified, for example, by Koonce at al. U.S. Pat. No. 3,355,899 and Corley, Jr. et al. U.S. Pat. No. 3,363,683, others have turned to submerged installations as exemplified by the teaching of McIntosh U.S. Pat. No. 3,366,173, and still others have utilized conventional platform arrangements.

Particular difficulties develop when it is desired to provide temporary offshore facilities. The very nature of temporary facilities dictates that expense involved in their fabrication and installation should be minimized. Nevertheless, while minimization of expense is desired, it is essential from the standpoint of ecological considerations and safety to ensure that the structures are sufficiently rugged and reliable as to be capable of safe, reliable, and reasonably prolonged use.

It is also desirable that structures, even of a temporary nature, be able to be installed with minimal effort and time while maintaining a high degree of safety and operational reliability.

As operations have proceeded into deeper and deeper waters offshore, a dichotomy has developed with respect to approaches utilized in the fabrication and installation of offshore systems.

One school of thought emphasizes virtually total reliance upon divers, while another school of thought emphasizes reliance upon precise alignment and remotely actuated assembly mechanisms.

The reliance upon precision alignment and remote actuators is reflected in prior patents such as Haeber U.S. Pat. No. 3,358,753, Dozier et al. U.S. Pat. No. 3,298,092 and Word, Jr. et al. U.S. Pat. No. 3,336,975.

All too often, such precision alignment concepts, with their attendant remote actuators, are vulnerable to damage or failure which might result from a stress condition acting on the installation, a failure in the actuating system, etc.

In order to effectively advance the offshore art, it is believed that a fresh perspective is required, entailing a discovery of how diver and surface operations can be effectively integrated so as to minimize the extent of diver operations, but, at the same time, virtually eliminate or at least minimize the prior art emphasis and reliance upon precision alignment and remote actuation of assembly means.

OBJECTS AND SUMMARY OF INVENTION

It is a fundamental object of the invention to provide methods and apparatus for effectively integrating diver and surface operations so as to improve the efficiency and reliability of offshore fabrication and installation techniques.

It is a particular object of the invention to provide such methods and apparatus which eliminate, or minimize, the need to rely upon precision alignment of submerged components and remote actuators which would interconnect such precision aligned components.

Another basic object of the invention is to provide methods and apparatus for making installations offshore where conduit components are interconnected in such a manner as to minimize or relieve stress during coupling operations, and maintain the stress relieving condition after the installation has been completed.

It is thus a related object of the invention to provide such methods and apparatus which yield offshore installations where stress, generated possibly by wave action induced movement of offshore structures, is relieved prior to its being transmitted to submerged, installation coupling zones.

Another object of the invention is to provide methods and apparatus, as heretofore noted, by means of which a stable but temporary offshore installation may be fabricated with maximum rapidity but minimized cost and structural complexity, even when offshore conditions are adverse.

In recognition of the desirability of attaining these basic objectives, one aspect of the invention, intended to accomplish at least some of the foregoing objects, entails a method of making an offshore installation. In practicing this method, a platform means is provided in an offshore area. Platform stabilizing means is provided, engaging a submerged surface so as to generally stabilize the platform means in relation to a submerged location. Base means is positioned on the submerged surface. On this base means there is provided a plurality of proximity — but not alignment — determining, pipeline socket means. Each such socket means includes a pipeline means receiving passage.

In relation to one of the pipeline socket means, a cable means is provided which extends from one pipeline means (supported on pipelaying vessel means) downwardly through a water body, into and through this one of the pipeline socket means, and upwardly to the platform means. By exerting tension on this cable means from the platform means, the one pipeline means is thereby pulled off of the pipelaying vessel means downwardly through the water body and into socketed engagement with the one pipeline socket means.

This pipeline means socketing operation is then repeated (possibly utilizing the same pipelaying vessel as that utilized to socket the first pipeline means or possibly another pipelaying vessel) so as to socket other pipeline means in other of the pipeline socket means.

Prior to the completion of the installation (i.e., before or after the socketing of the various pipeline means, and subsequent to the positioning of the base means), a caisson means is connected with the base means. This caisson means comprises body means and a plurality of riser means extending longitudinally of and disposed within the body means. Each such riser means has a lower portion projecting transversely outwardly of a lower portion of the body means.

With respect to each of the socketed one and other pipeline means, first and second coupling means are lowered through the water body to the vicinity of the base means.

Utilizing one or more divers, the first coupling means, with the aid of one or more divers, is interconnected between the socketed one pipeline means and a projecting lower portion of one of the riser means. Again using one or more divers, the second coupling means is interconnected between the other socketed pipeline means and a projecting lower portion of another of the riser means.

Yet another aspect of the invention, entailing independent significance, is directed to a method of making an offshore installation where a base means is positioned on a submerged surface and where a stabilized platform means is provided. Proximity determining pipeline socket means included on the base means provides a pipeline means receiving passage. Utilizing tensioned cable means (cable means as here, and previously and subsequently used, denotes any flexible structure, whether metallic cable, rope cable, chain, etc.), a pipeline means, supported on pipelaying vessel means, is pulled off of the pipelaying vessel means, downwardly through the water body and into socketed engagement with the pipeline socket means. Prior to the completion of the installation, and subsequent to the positioning of the base means, at least one riser means is connected with the base means.

A selectively adjustable coupling means is lowered through the water body toward the socketed pipeline means. This coupling means includes telescoping joint means and misalignment accommodating coupling means. Utilizing at least one diver, the adjustable coupling means is interconnected between and with the socketed pipeline means and a lower portion of the riser means, misalignment between these components notwithstanding.

A third aspect of the invention, again of independent import, entails a method of making an offshore installation where a submerged base means is anchored to a submerged formation means. A pipeline means is socketed on one portion of the base means. A well fluid receiving means is latchingly engaged with another portion of the submerged base means. Utilizing at least one diver and selectively extensible coupling means operable to accommodate misalignment between the pipeline means and the well fluid receiving means, the well fluid receiving means and pipeline means are interconnected in well fluid transmitting communication.

A still further independently significant method aspect of the invention involves a concept where one of the pipeline means comprises at least a pair of interconnected pipelines. The pipeline socket means is operable to cooperate with the dual (or multiple) pipeline assembly so as to rotate the assembly, if necessary, into a predetermined rotary position relative to the socket means with which the dual pipeline assembly is socketed. In this method approach, the coupling means which serve to interconnect the dual pipeline assembly with riser means of the caisson means (or conduit means of a fluid receiving or supplying facility) comprises a pair (or appropriate plurality) of selectively adjustable coupling means. Each such coupling means includes a telescoping joint means and a pair of misalignment coupling means disposed at each end of the telescoping joint means.

Other additionally significant facets of the invention, in the context of the foregoing basic method techniques, entail methods of installation for effecting vertical installation of the aforesaid caisson means, inclination of the base means notwithstanding.

Of further significance in the context of the foregoing method aspects of the invention, and of special overall import when utilized, is a method concept of supporting socketed pipeline means so as to effectively relieve stress during the pipeline socketing operation and thereafter, even when the installation is complete.

As will also be appreciated, independently significant facets of the invention entail synergistically interacting combinations of apparatus means operable to implement the functions described above in connection with method aspects of the invention.

With the objects and summary of inventive aspects of the invention having been set forth, it now becomes appropriate to consider certain detailed aspects of a preferred embodiment of the invention. While such a preferred embodiment will be discussed in detail, it will be appreciated that the embodiment itself is not determinative of or limiting with respect to the scope of the invention but, rather, the scope of the invention is as set forth in the appended claims.

DRAWINGS

In describing the preferred embodiment of the invention, reference will be made to the appended drawings.

In the drawings:

FIG. 1 provides a schematic perspective view illustrating a completed offshore installation fabricated in accordance with the present invention, this installation being intended to permit flow lines from subsea wellheads to be connected with riser means extending upwardly through base secured caisson means. Fluid transmitted through these connecting lines and upwardly through riser means of the caisson means to a platform means, is treated, as for example by conventional well fluid, phase separation techniques. The treated fluid is then conveyed downwardly through other riser means extending through the caisson means to distribution pipelines laid on a submerged surface. These distribution lines extend to a storage or loading facility which may be of a floating nature;

FIGS. 2a through 2l sequentially illustrate method steps of the invention which serve, when completed, to yield the aforesaid installation of an offshore multiple well fluid treatment and treated well fluid distribution facility. In this sequence of schematic elevational views:

Figure 1:
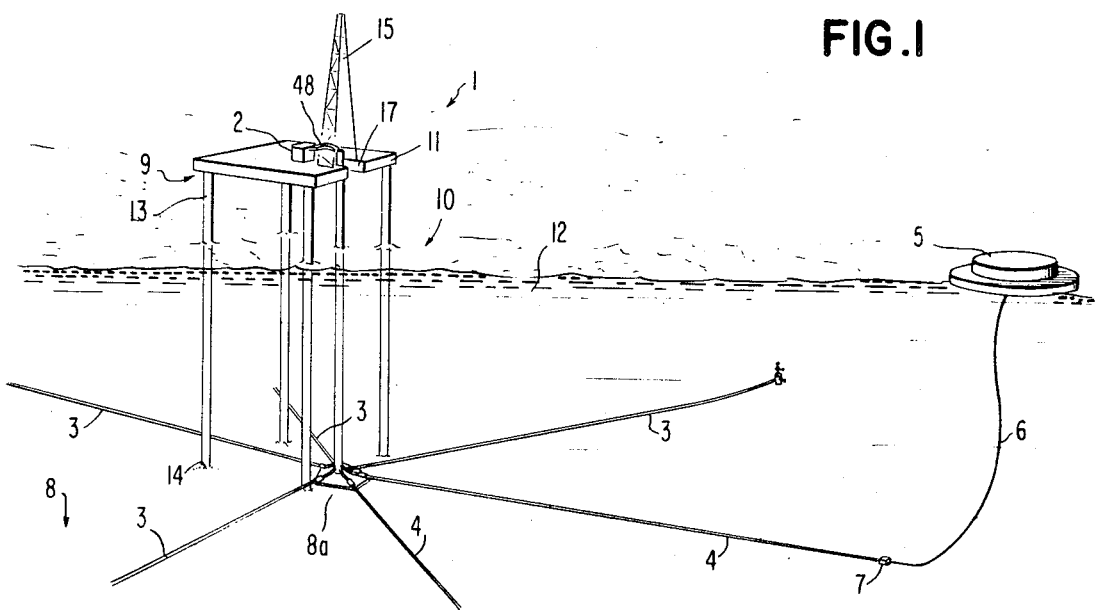
Figure 7:
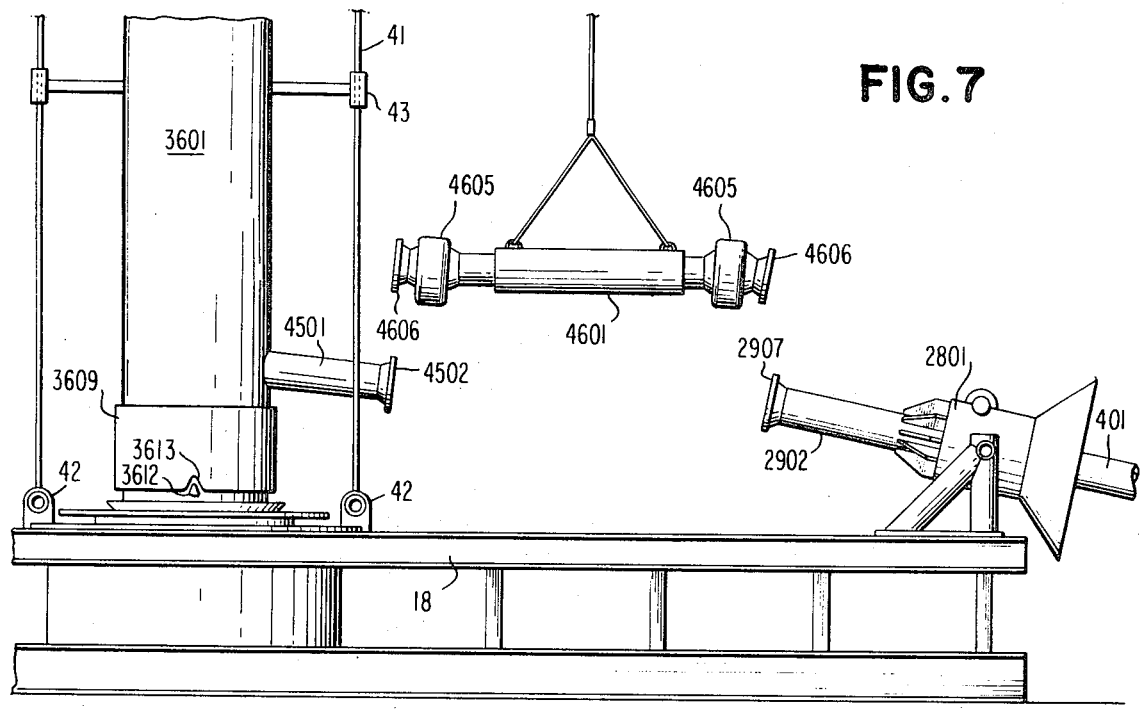
Figure 13:
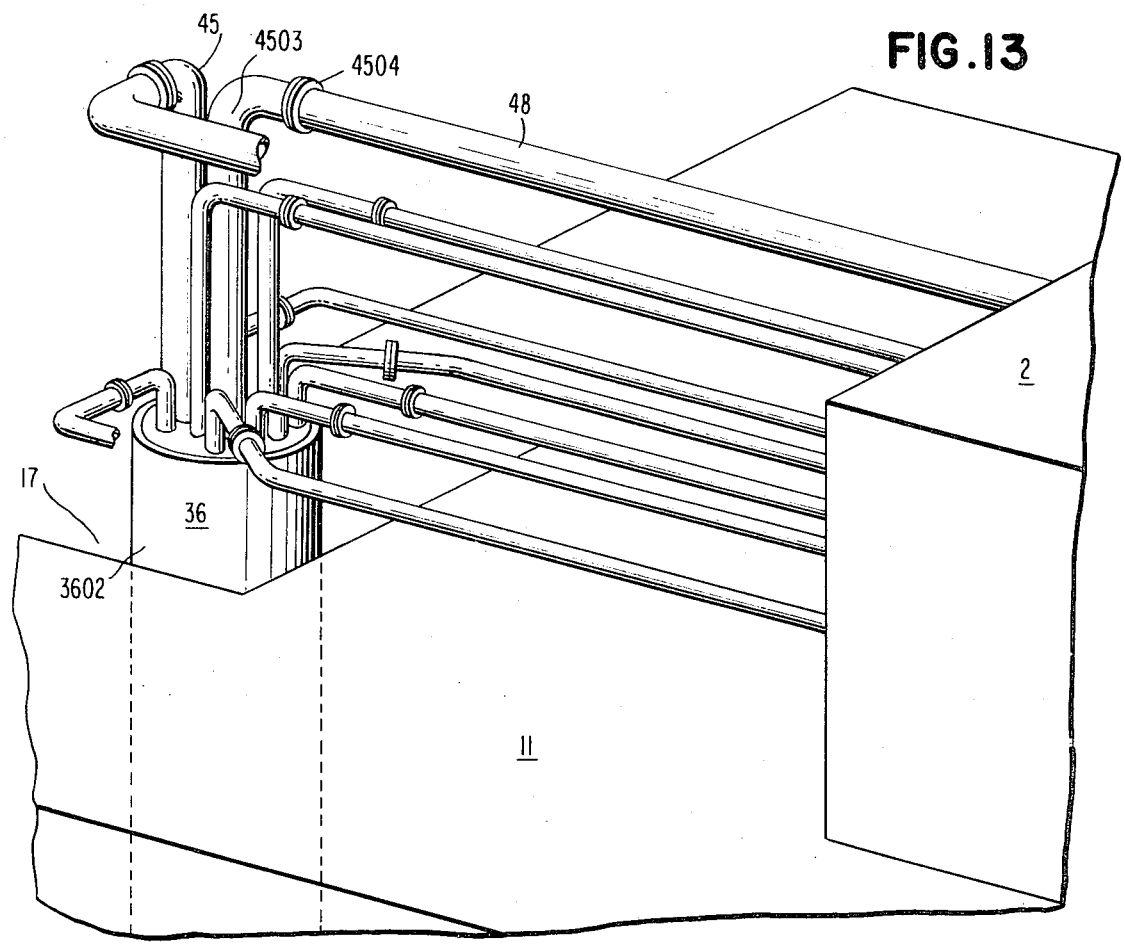
Figure 10:
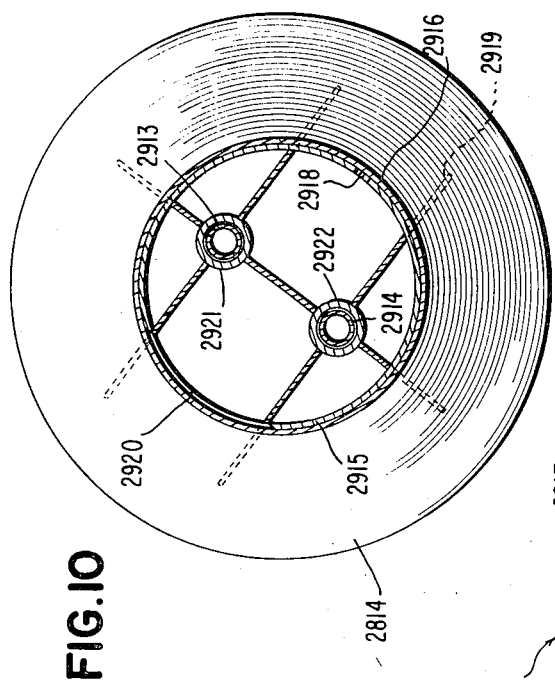
Figure 12:
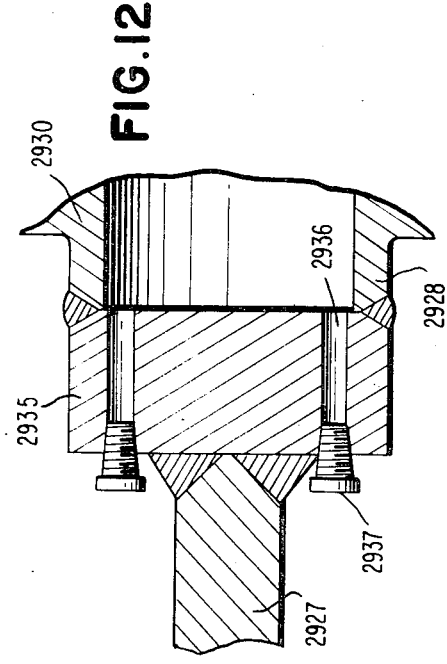
Figure 9:
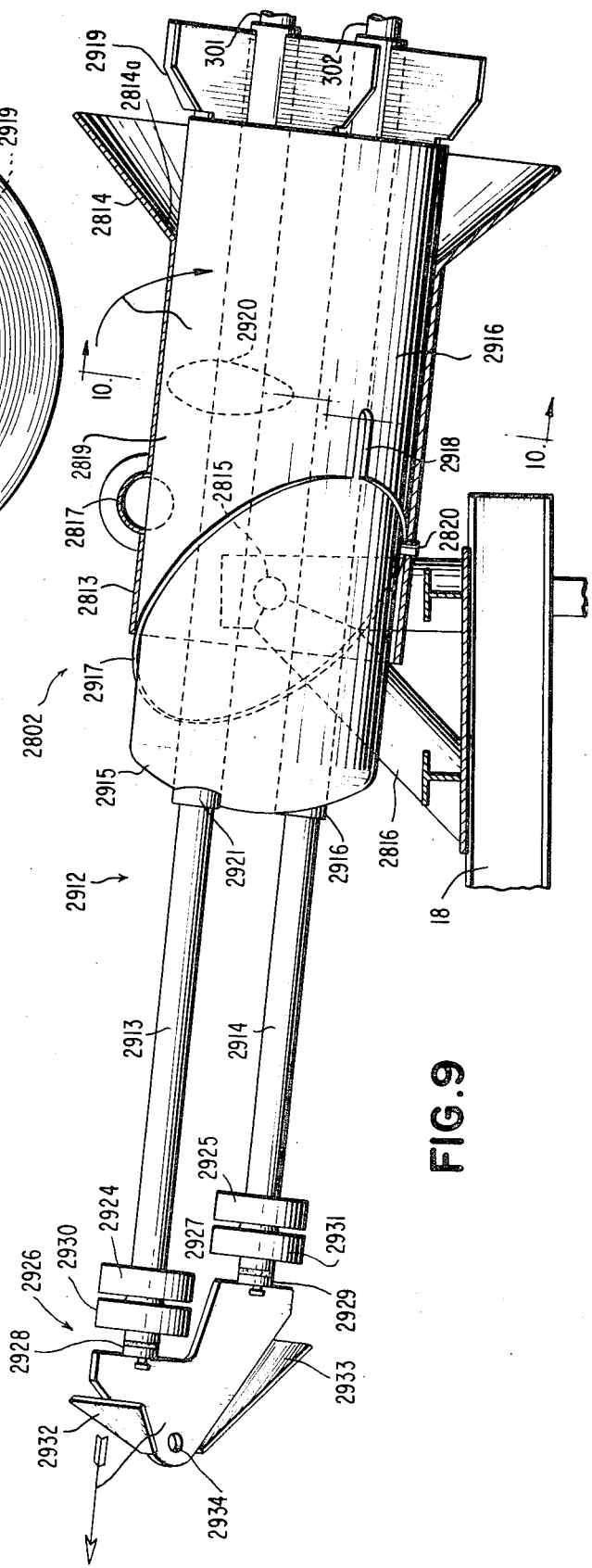

FIG. 2d schematically illustrates a pile installing technique which serves to anchor the base means to the submerged surface, this operation entailing the drilling of a pile receiving cavity beneath the base means, the lowering of a pile means into the cavity, the cementing of the pile means to the cavity with the pile means being latchingly engaged with the base means, and the subsequent removal of the conduit string which serve to support the pile means during the lowering operation and transmittal of cement to the pile means for the cement anchoring operation;

FIG. 2e illustrates the installation of a tensioning cable between a platform mounted winch means, a pipeline socketing means on the submerged and anchored base, and the free end of a pipeline supported on a pipelaying barge;

FIG. 2f illustrates the manner in which the cable means is tensioned from the winch means on the platform means so as to draw the pipeline means off of the pipelaying barge and downwardly through the water body and into socketed engagement with the base carried pipeline socket means. As will be apparent from the subsequent discussion, the tensioning cable means may be sequentially manipulated in relation to each of a plurality of pipeline means and pipeline socketing means so as to sequentially dispose the ends of a plurality of pipeline means in socketed engagement with the base means;

FIG. 2g illustrates the socketed disposition of one pipeline means relative to the base carried socket means;

FIG. 2h illustrates the removal of the tensioning cable means;

FIG. 2i illustrates the manner in which a floating vessel may serve to bring a caisson means into close proximity to the jack-up rig;

FIG. 2j illustrates the manner in which a derrick (or hoisting means) and/or davit means on the floating vessel of FIG. 2i is utilized to support one end of the caisson means, while the other end of the caisson means is being flooded so as to cause the caisson means to be oriented in the generally upright configuration shown in FIG. 2j, adjacent the jack-up rig;

FIG. 2k illustrates the manner in which the support of the upper end of the caisson means is transmitted from the floating vessel to the hoisting means of the jack-up rig, so as to permit the caisson means to be supported by the hoisting means of the jack-up rig directly above a caisson socketing or latching portion of the base means;

FIG. 2k also illustrates the manner in which the guide cable means may facilitate the guided lowering of the caisson means into aligned and latching cooperation with the caisson socketing or latching means of the base means; and FIG. 2l illustrates the completed installation after one or more divers have manipulated an adjustable coupling means, lowered from the platform means, so as to interconnect the pipeline means socketed on the base means with riser means of the caisson means;

FIG. 2l further illustrates the representative lowering of one adjustable coupling means from the platform means of the jack-up rig to the base means;

FIG. 3 provides a top plan view of the base means of the FIG. 1 assembly, illustrating a generally radiating pattern of socketed pipeline means of a diverse nature;

FIG. 4 provides a transverse vertical sectional view of one portion of the FIG. 1 base means, as viewed generally along view direction 4—4, illustrating the manner in which a tensioning cable serves to socketingly engage a pipeline means, comprising a single pipeline and pulling assembly, with one pipeline socket means;

FIG. 4 further illustrates the manner in which a base means anchoring pile means is disposed in socketed, self-aligning, anchoring cooperation with the base means;

FIG. 5 provides an enlarged, partially vertically sectioned, fragmentary view of the socketed assembly of FIG. 4, illustrating the manner in which the FIG. 4 pulling assembly serves to pull the pipeline means into socketed cooperation with the FIG. 4 socket means;

FIG. 6 provides a transverse vertical sectional view of the socketed pipeline of FIG. 4 illustrating the manner in which a locking pin serves to maintain this socketing engagement, FIG. 6 being viewed generally along section line 6—6 of FIG. 8;

FIG. 7 schematically illustrates the manner in which a telescopable and misalignment accommodating coupling is lowered to the vessel of the socketed FIG. 4 installation, after the pulling assembly and cable have been removed, so as to permit one or more divers to connect the socketed pipeline in fluid communicating relation with a riser means of caisson means disposed in anchored cooperation with the base means;

FIG. 8 provides a transverse sectional view of the FIG. 3 assembly, again viewed generally along the view direction 4—4 and illustrating the completed installation of the socketed pipeline means, adjustable coupling means, and caisson means housed riser means;

FIG. 9 provides a partially sectioned, side elevational view of another, dual pipeline means of the FIG. 3 assembly, illustrating the manner in which a tension cable operated pulling assembly serves to rotate the pipeline means within a pipeline socket means into a predetermined rotary position, with FIG. 9 being viewed generally along view direction 9—9 of FIG. 3;

FIG. 10 provides a transverse sectional view of a centering and stabilizing portion of the pulling assembly of the FIG. 9 pipeline means;

FIG. 11 schematically illustrates the FIG. 9 pipeline means after it has been rotated into a desired and predetermined rotary position within its pipeline socket means (the completed installation of the FIGS. 9 and 11 pipeline means relative to the aforesaid caisson means is shown in top plan view in FIG. 3, both being effected generally as described in connection with FIG. 7, but utilizing a pair of diver manipulating adjustable coupling means in relation to the FIG. 9, dual pipeline means);

FIG. 12 provides an enlarged transverse sectional view of an end portion of one of the pipelines of the FIG. 9 assembly, illustrating the location of diver manipulatable, pipeline flooding plugs, such plugs being operated prior to the installation of the previously noted selectively adjustable coupling means and before the removal of the pipeline means pulling assembly;

FIG. 13 provides a fragmentary, perspective view illustrating the manner in which the caisson means and riser means serve to transport well fluid to a platform located separator, with the separated or treated well fluid being conveyed back down through riser means of the caisson means, to distribution lines; and FIG. 14 provides a fragmentary, vertical sectional view of an upper portion of the aforesaid caisson means, illustrating telescoping or stress relieving connection means between the riser means housed by the caisson means and the body of the caisson means.

OVERALL TECHNIQUE FOR EFFECTING INSTALLATION

FIGS. 1 and 2a through 2i schematically illustrate a completed offshore installation 1 and its general mode of fabrication.

At the outset it should be recognized that, in this particular embodiment of the invention, a disclosure is made of a temporary installation intended to provide above water support for well fluid treating or separation equipment 2.

Such separation equipment 2 is intended to facilitate the separation of well fluid, supplied by pipeline means 3 extending from submerged wellheads into constituent or phase components such as gas, oil, and/or water. At least some of the separated components, and particularly the oil phase, may be moved from the separator equipment 2 downwardly through riser means associated with the installation 1 to distribution pipeline means 4 laying on the submerged surface.

Each of the distribution pipeline means 4 may serve to transmit separated well fluid to a conventional, buoyant reservoir means such as the floating reservoir means 5 schematically shown in FIG. 1. Fluid may be transported from pipeline means 4 upwardly to floating reservoir means 5 by way of conventional, flexible conduit or connection means 6 as described generally, for example, in Corley Jr. et al. U.S. Pat. No. 3,363,683.

A weighted anchor 7, possibly fabricated of concrete, may straddle the terminus of each pipeline means 4 at the vicinity of the junction between the pipeline means 4 and flexible connection means 6. Such an anchor 7 would stabilize this junction in relation to the submerged surface 8 upon which the pipeline means 3 and 4 are laid.

With the general context of the invention having been described, it now becomes appropriate to consider overall method aspects of the installation and their general sequence.

POSITIONING OF JACK-UP RIG

Installation 1 is initiated by moving a floating vessel or conventional "jack-up" rig 9 to an offshore area 10. Jack-up rig 9 may be towed by tugboats to the location 10, with the hull portion 11 of the jack-up rig 9 buoyantly supported by the water body 12. During this towing or positioning operation, the various legs 13 of the jack-up rig 9 would be raised in an upper position, i.e., projecting upwardly from the hull 11 in a manner well recognized in the art.

When the jack-up rig 9 was appropriately located at location 10, the submerged surface engaging and platform stabilizing leg means 13 would be lowered (usually by operation of jack means) from the platform or hull portion 11 of the jack-up rig 9. This lowering of the leg means 13 would cause the lower portions 14 of the legs to engage the submerged surface 8 and generally stabilize the platform means 11 in relation to a submerged location 8a.

At this point, it will be recognized that submerged location 8a will have been predetermined as an appropriate location for the juncture of the various pipeline means 3 and 4.

Figure 2A:
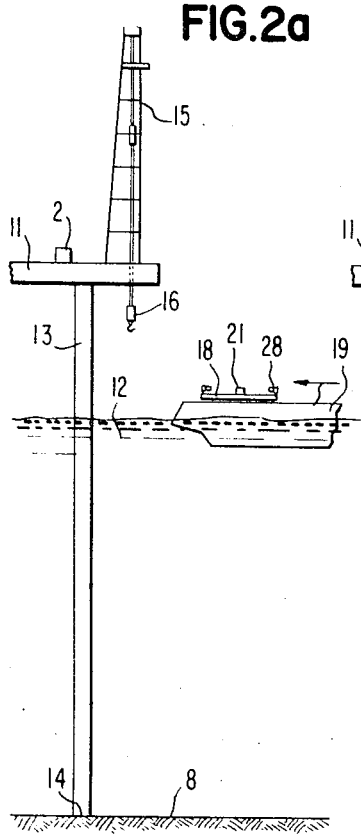
FIG. 2a illustrates the positioning of a floating vessel adjacent an installed "jack-up" rig so as to position a base means in engageable proximity with a hoisting means carried by the platform portion of the jack-up rig.

With the jack-up rig 9 positioned as generally shown in FIG. 2a, the jack-up rig derrick 15, with its associated, conventional hoisting (i.e., raising and lowering) means 16, (comprising traveling block, etc.) would be positioned so as to enable the hoisting means 16 to lower and, if necessary, raise articles in vertical alignment with the preselected subsurface location 8a.

In a conventional manner, hoisting means 16 would be disposed in vertical alignment with a slotted end portion 17 of the jack-up rig platform means 11.

INSTALLATION OF BASE MEANS

Figure 2B:
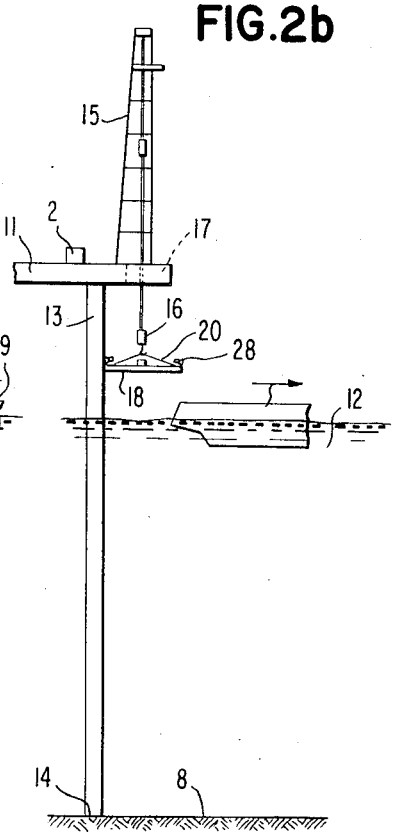
FIG. 2b illustrates the base means supported by the hoisting means of the jack-up rig.
Figure 2C:
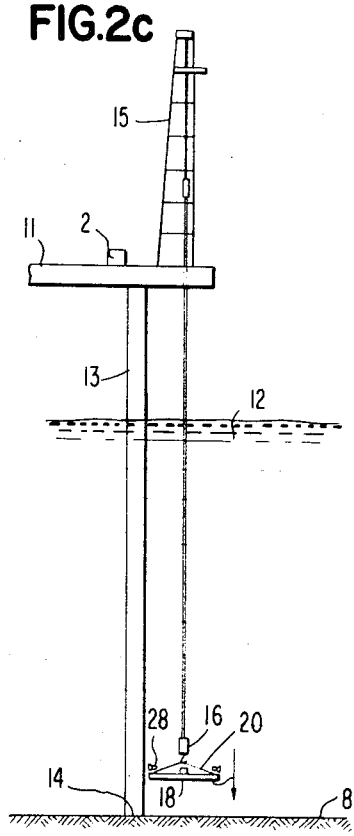
FIG. 2c illustrates the lowering of the base means to a preselected submerged location by operation of the jack-up means hoisting and lowering gear.

FIGS. 2a–2c illustrate the manner in which an installation base means 18 is positioned generally adjacent and beneath the platform means 11.

As shown in FIG. 2a, base means 18 may be buoyantly supported on barge means 19 and positioned in engageable proximity with hoisting means 16, with hoisting means 16 extending downwardly through platform slot means 17.

With hoisting means 16 manipulated into engagement with base means 18, possibly utilizing conventional sling means 20, the base means 18 may be transferred from the barge supported position of FIG. 2a to the platform means supported position of FIG. 2b.

With the base means 18 supported by platform carried hoisting means 16, as shown in FIG. 2b, the base means 18 may be lowered into engagement with the submerged surface site 8a by operation of hoisting means 16, as generally shown in FIG. 2c.

FIG. 2d illustrates the completed positioning of the base means 18 on the submerged surface location 8a, with hoisting means 16 retracted and barge means 19 removed.

In a manner to be subsequently described in greater detail, base means 18 may be provided with a gimbled, pile receiving and latching socket means 21.

Socket means 21 is intended to receive a vertically oriented pile means which passes through the socket means 21 and base means 18 into a submerged formation means 22, the orientation of base means 18 notwithstanding. The gimbled nature of socket means 21 is such that base means 18 may be canted or non-horizontal, yet receive and latchingly engage a vertically oriented base anchoring pile means.

With this general function of socket means 21 having been described, it now becomes appropriate, with reference to FIG. 2d, to briefly review the mode of installation of a base anchoring, pile means 23.

Utilizing, for example, the general pile installation technique shown in Kliewier U.S. Pat. No. 3,503,217 (but in a different context), a pile may be installed in socket means 21 so as to effectively anchor base means 18 to submerged formation means 22.

In conjunction with derrick means 15, a conventional rotary drilling apparatus on platform means 11 may be employed to drill a pile receiving cavity 24 beneath the vertically apertured socket means 21 and the base means 18.

Thereafter, a pile means 23 may be connected to the lower end of a cementing string 26, by a detachable connection 27, in the manner generally described, for example, in the aforesaid Kliewier U.S. Pat. No. 3,503,217. The pile 23 may be lowered on cementing string 26 so that it passes through the vertically apertured portion of socket 21 and extends into the previously drilled cavity 24.

Pile 23 may be lowered until it is disposed in automatically latched engagement with socket 21 in a manner to be subsequently described.

In this connection, it will be understood that the gimble mounted nature of socket means 21 will permit the pile means 23, when latched with the socket means 21, and during its installation, to maintain its vertical orientation, any tilting or canting of the base means 18 notwithstanding.

With the pile means 23 disposed in latched engagement with the socket means 21, conventional cementing equipment may be operated on platform means 11, as generally described in the aforesaid Kliewier U.S. Pat. No. 3,503,217, to pass cement downwardly through the string 26 and pile means 23 and, in essence, grout or cement the annular zone between the pile 23 and the cavity 24.

After the cementing operation has been completed, the detachable connection 27, an example of which is described in the U. S. Kliewier Pat. No. 3,503,217, may be manipulated by the conduit string 26 so as to permit the string 26 to be separated from the pile 23.

The string 26 may be then withdrawn upwardly to the platform means 11, by operation of the hoisting means 16, and the cement injected through pile 23 allowed to harden in submerged formation means 22.

The hardening of this cement will serve to anchor the pile means 23 to the submerged formation means 22 and thus anchor the base means 18 to the submerged formation means 22.

Base means 18, when lowered, may be provided with a plurality of pipeline receiving socket means 28, each intended to socketingly connect — but not precision align — a pipeline means relative to base means 18.

One such socket means 28 is schematically illustrated in FIG. 2e. However, it will be recognized that an individual socket means 28 is provided for each of the pipeline means 3 and 4 schematically shown in FIG. 1.

Base means 18 will be prefabricated so that each of the various socket means 28 is disposed in a predetermined orientation and position, operable to socket the various pipelines in the predetermined network orientation deemed desirable. This orientation will depend upon the position of the base means 18 in relation to the various fluid receiving stations 5 associated with the distribution lines 4 and the various wellheads associated with the supply lines 3.

In a manner to be subsequently described in greater detail, it will be recognized that each of the socket means 28 is provided with a pipeline means receiving passage, intended to socketingly receive a socketing or pulling head portion 29 of each of the pipeline means.

Each socket means 28 is anchored to the submerged formation means by way of the anchored relationship between the base means 18, the pile means 23, and the submerged formation means 22.

Further, each socket means 28 is pivotally supported for movement about a generally horizontally extending, pipeline stress relieving pivot axis which extends generally perpendicularly or transversely of a longitudinal axis of the pipeline receiving passage, i.e., generally transversely or perpendicularly of the longitudinal axis of the end of a pipeline received in the socket means 28.

PIPELINE SOCKETING OPERATION

Sequentially, and in relation to each of the various socket means 28, the pipeline means 3 and 4 are disposed in socketed, stress relieving engagement with the base means 18.

The socketing sequence will be described with reference to FIGS. 2e–2h in relation to one of the distribution pipeline means 4. However, it will be understood that this sequence will be repeated, in sequence, with respect to each of the pipeline means 3 and 4.

As is shown generally in FIG. 2e, a draw line or cable means 30 may be positioned so as to extend downwardly from one pipeline means, for example, a pipeline means 4, supported on a pipelaying vessel means 31. Such a pipeline laying vessel means may correspond, for example, to an apparatus as shown in Lawrence U.S. Pat. No. 3,390,532. Depending upon water depths, the pipelaying apparatus 31 may or may not utilize a buoyant pipe supporting ramp or "stinger" depending downwardly from the stern of the vessel or pipelaying barge so as to provide buoyant support for the pipeline portion extending between the vessel 31 and the submerged surface 8.

For clarity of illustration, the arrangement shown in FIG. 2e depicts a pipelaying barge 31 without such a buoyant ramp. However, it will be recognized that, particularly in intermediate waters, such a buoyant ramp or stinger would be utilized.

As is also shown in FIG. 2e, the draw line or cable means 30 is attached to the outer extremity of the pulling head means 29 associated with the free end of the pipeline means 4.

The cable means 30 extends downwardly through the water body 12 and passes slidably through the pipeline means receiving passage of the socket means 28. Cable means 30 may thereafter pass through conventional base means mounted sheave means 32 and thence upwardly to winch or cable reeling means 33 on platform means 11.

The threading of cable means 30, as generally shown in FIG. 2e, between the pipeline means 4, socket means 28, sheave means 32, and winch means 33, may be effected with the aid of divers, service boats, etc., in a conventional and well recognized manner.

By operating winch means 33 so as to exert tension on cable means 30, and while maintaining controlled "hold back" tension on pipeline means 4 on barge means 31 (by operation, for example, of tensioning means as described in Lawrence U.S. Pat. No. 3,390,532), the pipeline means 4 will be drawn off of the stern of the barge means 31 and drawn downwardly through water body 12 toward socket means 28.

For ease of illustration, barge means 31 has been disposed in close proximity to platform means 11. However, it will be understood that barge means 31 will be disposed at a distance sufficient from socket means 28 so as to enable tension cable means 30 to draw pipeline means 4 off of barge means 31 and into socketed engagement with socket means 28 while maintaining an acceptable stress level in pipeline means 4. This technique for initiating a pipeline laying operation has been well known in the art for a decade or so and is reviewed, for example, in relation to previously known techniques, in Cox et al. U.S. Pat. No. 3,331,212.

The continued tension exerted on the cable means 30 which serves to move pipeline means 4 off of barge means 31, as shown in FIG. 2f, will ultimately serve to bring pulling head means 29 of pipeline means 4 into socketed engagement with socket means 28, as shown in FIG. 2g.

The pivoted or stress relieving nature of socket means 28 will enable pulling head means 29 (and thus the terminus of pipeline means 4) to be disposed in stress relieving, socketed engagement with socket means 28. This stress relieving engagement permitted by the pivotal nature of socket means 28, will enable stress to be relieved in pipeline means 4 and socket means 28 during the socketing operation. Even after these components are socketed, the pivotal nature of socket means 28 will permit stress to be relieved in the socket means 28 and pipeline means 4 in relation to other components of the installation connected with the pipeline means.

This stress relief is permitted by permitting the socket means 28 to be continuously pivotal about its stress relieving, pivotal axis during the pipeline socketing operation and thereafter.

As shown in FIG. 2g, the pulling head 29 has been drawn into and through the socket means 28 so as to dispose the pipeline means 4 in socketed engagement with the base means 18.

It is contemplated that the barge 31 may be disposed sufficiently removed from base means 18 as to cause the terminus of the pipeline means 4 to engage the submerged surface 22 at a point spaced outwardly of the base means 18 before the pulling head 29 is actually drawn into the socket means 28.

After the pulling head 29 has been drawn into the socket means 28, with abutting cooperation between the pulling head means 29 and socket means 28 preventing further movement of the pulling head means 29, one or more divers may install a latching pin 34 (or operate a latching means) so as to latchingly secure the pulling head means 29 within the socket means 28. In this socketed condition, a portion of the pipeline means 4 will pass entirely through the socket means 28 and generally extending toward the vertical axis defined by the pile receiving passage of the socket means 21.

This sequence of pipeline socketing operations will be repeated with respect to each of the various pipeline means 3 and 4 and their associated pulling head means 29. As will be understood, each pipeline may continue to be laid, after being socketed to base means, until its other end is located in desired proximity to a submerged well head or platform, etc.

It is contemplated that the same draw line means 30 may be utilized for each of the pipeline socketing operations. In order to accomplish this at the completion of the socketing of one pipeline, the draw line means 30 may be disconnected from the pulling head means 29 of the one socketed pipeline means. The sheave means 32 may be disconnected from the portion of the base means 18 associated with the socketed pipeline means, and reconnected with another portion of the base means 18 associated with the socket means 28 next intended to receive a pipeline means.

Utilizing divers and conventional cable installation techniques, the cable means 30 may then be reconnected with the pulling terminus 29 of the next pipeline to be drawn into socketed engagement with the base means 18.

This procedure may be repeated in sequence until all of the various pipeline means 3 and 4, schematically shown in FIG. 1, can be brought into socketed stress relieving engagement with the base means 18.

After the various pipeline means 3 and 4 have been brought into socketed engagement with the base means 18, the tensioning cable or draw line 30 may be disconnected from the last socketed pipeline, the sheave means 32 disconnected from the base means 18, and the sheave means 32 and cable means 30 then drawn upwardly to the platform means 11 by operation of the winch means 33 as schematically depicted in FIG. 2h.

At this point in time the installation has proceeded to the point where the base means 18 has been installed and anchored, and the termini of the various pipeline means 3 and 4 have been disposed in stress relieving, socketed engagement with the base means 18.

It now remains to interconnect the socketed ends of the various pipeline means with the well fluid treating equipment 2 disposed above the water body 12 on platform means 11.

This interconnecting of the socketed pipeline means is effected as schematically illustrated in FIGS. 2i–2l and involves the installation of caisson means and misalignment coupling means.

CAISSON MEANS INSTALLATION

As shown in FIG. 2i, a derrick barge 35 may serve to buoyantly transport a caisson means 36 to the vicinity of platform means 11.

As shown in FIG. 1, caisson means 36 will be installed in an upright position between base means 18 and platform means 11. As will be subsequently described, caisson means 36 comprises a housing for a series of generally vertically extending riser means, each of which provides communication between a pipeline means 3 or 4 and the separator or well fluid treatment facility 2.

Caisson means 36 may be handled and installed in a variety of ways. For example, as shown in FIG. 2i, caisson means 36 may be transported to site 10 on a ramp or deck portion of barge means 35. When the caisson means 36 is to be installed, it may be supported along its length at various points by davit lines 37 of the derrick barge 35. A rotary crane 38 of the derrick barge 35 may secure the upper terminus 40 of the caisson means 36, while the davit lines 37 are manipulated to position the caisson means "outboard" of the barge and lower end 39 of the caisson means in the water body 12.

The lower end of caisson means 36 is provided with a latching means operable to automatically latchingly engage the upper end of latched pile means 23 in a manner to be subsequently described.

Caisson means 36 may also be provided with one or more longitudinally extending buoyancy chambers, the flooding of which may be controlled from barge means 35, or by divers, in a conventional manner. By selectively flooding caisson means 36, commencing with the lower portion 39 and moving progressively toward the upper portion 40, and by controlling downward movement of the lower end 39 of caisson means 36 with the davit lines 37, the caisson means 36 may be safely manipulated to the upright or vertically extending position shown in FIG. 2j.

With the caisson means 36 disposed in the upright position of FIG. 2j, the rotary crane 38 may manipulate the caisson means into sufficient proximity to the hoisting means 16 as to enable the platform carried hoisting means 16 to be connected with the upper end 40 of the caisson means 36, and thereby assume support of the caisson means 36. With the caisson means 36 supported by the platform carried hoisting means 16, the crane 38 may be disconnected from the upper end 40 of the caisson means. The barge 35 may then be moved away from the vicinity of the jack-up rig 9.

The hoisting means 16 may then be manipulated so as to lower the vertically extending caisson means toward the pile means 23. As shown schematically in FIG. 2k, this lowering operation may be continued until the lower end 39 of the caisson means 36 latchingly engages the upwardly projecting pile means 23.

The upper portion, and possibly intermediate portions, of caisson means 36 may be connected with and supported by the platform means 11. For example, conventional truss or framing networks as generally described in Marshall U.S. Pats. Nos. 3,483,708 and 3,501,919. (In the present invention the framing or truss would serve to support the caisson 36 whereas in the Marshall patents the framing or truss work serves to support the upper end of bodies which function as pile driver devices.)

The installation of caisson means 36 may be facilitated by utilizing guideline means 41. For example, as is shown schematically in FIG. 2k, a plurality of guideline means 41 (2 or more) may extend from anchor point means 42 on base means 18, upwardly through guide collars 43 of caisson means 36 to anchor point means 44 on platform means 11. Such guideline means 41, when appropriately tensioned or tightened, would ensure that the lowering of the caisson means 36, by operation of the hoisting means 16, would bring the lower end 39 of caisson means 36 into aligned latchable cooperation with the projecting upper end of the pile means 23.

The utilization of such guideline means constitutes a technique which has been utilized in drilling, diving and pile driving operations for many years and thus now constitutes a conventional technique.

It is contemplated that the guide cables 41 may be installed by divers after the caisson 36 has been manipulated to the upright position of FIG. 2j.

Alternatively, "threading" lines, or possibly portions of the draw lines 41, could be positioned on the caisson means 36 while it is being supported on the barge means 35. It is also possible that the guideline means could be installed in a slack or loose state, running from the platform means 11 through the guide means 43 and downwardly to the anchor point means 42, when installation of the caisson means is commenced as generally shown in FIG. 2i.

Regardless of which technique is employed to install the guideline means, and regardless of whether divers or a combination of divers, service boats, barge personnel and/or platform personnel are utilized, the presence of the guidelines 41 will materially facilitate the bringing of caisson means 36 into latched cooperation with the base means 18.

With the caisson means 36 disposed in latched cooperation with the base means 18, and secured at its upper end in relation to the platform means 11, it remains to provide fluid communicating connections between the pipeline means 3 and 4 and the riser means carried by the caisson means 36.

In a manner to be subsequently described, each riser means 45 of the caisson means 36 will have a lower portion projecting transversely outwardly of the body of the caisson means 36, generally toward its respectively associated and base socketed pipeline means.

With this arrangement, and with the caisson 36 installed as shown in FIG. 2l, a plurality of lower ends of riser means 45 would project toward, but be spaced from, their respectively associated, socketed pipeline means 3 or 4.

MISALIGNMENT COUPLING MEANS
INSTALLATION

In order to interconnect the lower ends of the riser means 45 with the socketed pipeline means 3 or 4, one or more divers will be utilized. Such divers, utilizing selectively adjustable misalignment couplings, will complete the connections between the lower riser ends and the socketed pipeline ends and will be able to do so, misalignment between the pipeline ends and riser ends notwithstanding.

FIG. 2l schematically illustrates the manner in which hoisting means supported by the platform means 11 (possibly winch means 33, or a similar hoisting mechanism, and a cable and sling means 47) may be utilized to lower selectively adjustable coupling means 46 to the vicinity of base means 18. Each such coupling means, when installed, provides a fluid communicating connection between a pipeline means 3 or 4 and the lower end of a riser means 45.

As will be apparent from FIG. 2l, each such selectively adjustable coupling means 46 is lowered from the platform means 11 to the vicinity of the base means 18, and may be partially supported by the support means 47 while divers manipulate the coupling means into connected position.

As will be subsequently described in greater detail, each coupling means 46 may comprise a telescoping joint or body means, with a misalignment coupling means being mounted at each end of the telescoping conduit means. These structural and operational characteristics of the adjustable coupling means enable a diver to interconnect each coupling means 46 between a pipeline means and the lower end of a riser means, variable spacing and axial misalignment between the socketed pipeline means and the projecting lower end of the riser means notwithstanding.

As will be understood, of course, where a pipeline means 3, for example, comprises a plurality of separate flow lines, an individual coupling means 46 will usually be required in relation to each individual pipeline or flow line.

The connecting of the various adjustable coupling means may be effected sequentially, repeating the general procedure heretofore described, until all of the pipeline means 3 and 4 have been connected in fluid communicating relation with the various riser means 45 contained within the caisson means 36.

CONNECTIONS WITH TREATING EQUIPMENT

At this juncture, it becomes appropriate to consider the manner in which the upper ends of the riser means 45 are connected with the well fluid treating or separating equipment 2 supported on the platform means 11.

The connections between the upper ends of the riser means 45 and the fluid treating means 2 may be effected at any time after the caisson means 36 is installed, i.e., before, during or after the installation of the submerged selectively adjustable coupling means 46.

As is schematically shown in FIG. 1 and in FIG. 13, a connecting conduit means 48 is interconnected between the upper end of each riser means 45 and an appropriate conduit fitting on the fluid treating means 2.

GENERAL CONSIDERATIONS

With the overall installation completed, the apparatus shown in FIG. 1 will serve as an offshore installation operable to 1) treat well fluid received from a plurality of submerged well sites and 2) transmit treated well fluid to storage means 5 in the manner previously noted.

Thus, this arrangement is able to effect the type of offshore treatment generally described in such patents as Corley, Jr. et al. U.S. Pat. No. 3,363,683, Koonce et al. U.S. Pat. No. 3,355,899 and McIntosh U.S. Pat. No. 3,366,173.

When the utility of the installation 1 has terminated, the bulk of the installation is readily salvagable.

Salvage may be effected by disconnecting the riser means 45 from the various pipeline means in the installation 2, following which the caisson 36 may be brought to the surface and supported by a service boat through a procedure entailing generally the reverse of that described with reference to FIGS. 2i through 2k.

Divers may disconnect the coupling means 46 and disconnect the pipeline means from their latched condition in relation to the socket means 28. The various pipeline means may then be retrieved and salvaged, utilizing conventional submerged, pipeline salvaging operations.

Utilizing, for example, explosive pile cutting means, and with the aid of one or more divers, the pile means 23 and/or the socket means 21 may be cut free or disconnected from the base means 18 so as to destroy the anchored connection between the base means and the submerged formation means 22. The base means may then be salvaged and/or reused.

It may also be possible, with the caisson means 36 removed, for divers, utilizing adjustable or preformed connecting means, to directly connect the socketed ends of the fluid supplying pipeline means to intermanifold some or all of the pipelines 3 or 4.

It might also be feasible, in certain instances, to install submerged well fluid treating means on the base means 18, with the pipeline means 3 and 4 being connected to such submerged well fluid treating means instead of to the platform located, fluid treating means 2.

In any event, when salvaging has been completed as heretofore described, or when submerged connections between pipeline means 3 and 4 have been effected as heretofore described, it would be possible to move the jack-up rig 9 away from the offshore site 10. In a manner now well understood, this may be effected by merely raising the legs 13 of the jack-up rig 9 relative to the hull means 11 so as to dispose the hull or platform means 11 in floating condition, with the legs 13 projecting upwardly from this floating platform means. The floating platform means may then be moved to a new location for further operations.

The overall method aspects of the invention have been described in detail sufficient to provide an appreciation of the overall invention. It thus now becomes appropriate to consider specific structural details of various components of the installation.

OVERALL STRUCTURE OF SYSTEM

The overall structure of components of installation 1 will now be described with reference to FIGS. 3-14.

In order to facilitate the discussion of the detailed structural aspects of the invention, reference numeral "prefixes" are utilized which correspond, where appropriate, to reference numerals utilized in the discussion of method aspects of the invention. Thus, for example, components of base means 18 will be designated by reference numerals 1801, 1802, etc., components of pipeline means 3 by reference numerals 301, etc.

BASE MEANS

Structural details of base means 18 are illustrated in FIGS. 3, 4, 5, 6, 7, 8, 9, 10 and 11.

Base means 18 comprises a generally flat or planar working platform means 1801. This submerged platform means may be fabricated, at least in part, from conventional foraminous deck plating of the type conventionally used in offshore platform structures. Deck means 1801 may be supported on a rigid framing network 1802. "Mud" engaging plate means may be positioned in a lower portion of framing 1802.

Platform means 1801 provides a working surface upon which divers may stand, while such divers are performing various operations such as the installation and/or removal of cable means 30, the installation of coupling means 46, etc.

Base means 18 includes a generally centrally located and vertically oriented aperture 1803.

An upwardly facing, downwardly converging, generally frustoconical gimble seat 1804, having a generally vertical axis when platform means 1801 is horizontally oriented, is mounted in aperture means 1803 as generally shown in FIG. 4.

Socket means 21 comprises a generally cylindrical body 2101. As shown in FIG. 4, socket body 2101 may provide an interior, downwardly converging, frustoconical, pile socketing surface 2102. A snap ring receiving, annular groove 2103 may be formed in an upper portion of surface 2102 as generally shown in FIG. 4.

Body 2101 may be supported on a plurality of circumferentially spaced, generally radially and outwardly extending, web means 2104. These web means have upwardly and outwardly sloping lower surfaces 2105 which rest on gimble seat 1804 and thus provide a "universal" or gimble mount for body 2101. Thus, the nested engagement of web means 2105 on gimble seat 1804 provides a gimbled mounting arrangement for socket means 21 in relation to the remainder of the base means 18.

A radially outwardly extending mounting plate means 1805, connected with body means 2101 by way of web means 2104, provides a mechanism for movably interconnecting socket means 21 with the remainder of base means 18. As shown in FIG. 4, this mounting arrangement is implemented by upwardly projecting, rod-like fastenings 1806 which pass through relatively large, circumferentially spaced, openings 1807 in mounting plate means 1805. Threaded fasteners 1808 serve, while in place, to prevent the removal of plate means 1805 from mounting rod means 1806.

The size of aperture means 1807 is such as to permit gimbled or swiveling movement of socket means 21 relative to base means 18.

When the pile means 23 is lowered into socketed engagement with the socket means 21, it will be vertically oriented, as a result of its being suspended vertically from the platform means 11. As a result, the telescoping engagement between pile means 23 and socket means 21 will cause the socket means 21 itself to move to an orientation where the axis of the socket body passage 2106 is vertical, regardless of whether or not base means 18 is canted due to canting of the supporting submerged surface 8.

As has been earlier indicated, base means 18 is provided with a plurality of generally peripherally dispersed, pipeline receiving socket means 28. Each such socket means provides a pipeline receiving passage oriented laterally outwardly of socket means 21 so as to receive a pipeline drawn laterally into the socket means.

One such type of socket means 2801, as shown generally in FIGS. 3-7, is intended to socketingly receive a distribution pipeline means 4 comprising a single pipeline 401.

Another type of socket means 2801, shown in FIGS. 3 and 9-11, is intended to socketingly receive a dual pipeline means 3. Such a dual pipeline means comprises a pair of generally parallel, but "bundled," flow lines 301 and 302 extending from submerged wellheads.

A socket means 2801 is associated with each of the two distribution lines 401 schematically shown in FIG. 3.

A representative socket means 2801 is illustrated in FIGS. 4, 5, 6, 7 and 8.

As shown in these Figures, socket means 2801 comprises a generally cylindrical body portion 2803 which is pivotally supported on stress relieving, pivot means 2804. Pivot means 2804 comprises a pair of bracket means 2805 and 2806 projecting upwardly from platform means 1801 on opposite sides of body means 2803. Stub axle means 2807 and 2808 project perpendicular and outwardly of the axis of body means 2803 and are connected therewith. These stub axles 2807 and 2808 are pivotally received with sleeve-type journal mounting means 2809 and 2810 of bracket means 2805 and 2806, respectively. The stress relieving pivot axis defined by pivot shaft means 2807 and 2808 extends perpendicular to the axis of the pipeline receiving passage 2818 of body means 2803 and generally perpendicular to the longitudinal axis of the pipeline 401 when it is socketingly received within the socket means 2801.

Socket means 2801 additionally includes an outwardly diverging, frustoconical guide or entry mouth means 2811, as generally depicted in FIG. 5.

A transversely extending, generally tubular housing means 2812 is mounted on body means 2803. Body means 2812 cooperates with body means 2803 to provide a generally cylindrical socket operable to slidably receive a pipeline latching pin 34, which is diver installed in a manner subsequently set forth.

As will be noted with reference to FIG. 5, pivot mounting means 2804, at all times, will enable the socket means 2801 to undergo pivotal movement operable to relieve pipeline stress in pipeline means 401 and socket stress in socket means 2801. In other words, if the pipeline 401 should tend to undergo generally vertical pivotal movement relative to the base means 18, such movement will be permitted by the stress relieving pivot means 2804 and by flexible coupling means 46, so as to avoid the generation of stress within the pipeline 401 or the socket means 2801.

Socket means 2802 may comprise a generally cylindrical body portion 2813. Body means 2813 may be provided with a generally outwardly facing and diverging, pipeline receiving, guide means or entry mouth 2814.

Pivot mounting means 2815, corresponding in general to the previously described stress relieving pivot mounting means 2807, 2808, 2809 and 2810, may be provided to support body means 2813 on bracket means 2816. Bracket means 2816 may correspond in general to units 2805 and 2806 and may be mounted on platform means 1801. Bracket means 2816 may be disposed in relation to body means 2813 in a manner akin to the socket supporting arrangement of bracket means 2805 and 2806 as described in connection with socket means 2801.

Each socket means 2802 may be provided with a generally tubular housing means 2817. Each such housing means 2817 cooperates with a socket body means 2813 so as to define a passage extending transversely of body means 2813. This passage is operable to receive a diver installed latching pin 34.

As shown in FIG. 9, body means 2813, at a lower portion disposed in general alignment with a plane passing through the central longitudinal axis of passage means 2819, and perpendicular to the pivot axis of pivot connection means 2815, is provided with a cam follower or locking pin 2820. In a manner to be subsequently described, cam follower means 2820 cooperates with a camming edge on the pulling head of pipeline means 3 so as to ensure appropriate rotary positioning of the pipeline means 301 and 302 relative to the base means 18 and socket means 2802.

As is shown in FIG. 9 in connection with socket 2802, and as is shown in FIGS. 5 and 6 in connection with socket means 2801, the latching pins 34 are disposed transversely of their respectively associated socket means so as to project radially inwardly of the interior of the pipeline receiving passage means thereof.

Thus, as shown in FIGS. 5 and 6, latching pin 34, when positioned in housing means 2812, projects radially into the interior of pipeline receiving aperture 2818. Similarly, as is evident from FIG. 9, pin 34, when received in housing 2817 of socket means 2802, projects into the interior of pipeline receiving passage 2819 of socket means 2802.

Associated with each of the socket means 2801 and 2802, and disposed inwardly thereof but in general longitudinal alignment therewith, is a sheave mounting post 3201. Each such sheave mounting post is operable to detachably support a sheave means 32 which functions to guide the tensioning cable means 30 as it moves from the socket means 2801 upwardly to the platform means 11.

Each such sheave means 32 may comprise a snatch block type or standard sheave means 3202 operable to be pivotally connnected with mounting means 3201 by a conventional, detachable mounting linkage 3203.

Socket means 2802 is illustrated generally in FIGS. 9, 10 and 11. One such socket means 2802 is associated with each of the four flow line means 3 shown in FIG. 3.

Before considering the manner in which the base means is anchored to the submerged formation means 22 and the various pipeline means brought into socketed engagement with the base means, it is appropriate to consider additional details of the base anchoring system and the mechanism, by means of which pipelines are pulled off by lay barges and into socketed engagement with the socket means 28.

BASE ANCHOR MEANS

As is shown in FIG. 4, pile means 23 may be generally tubular in nature. This pile means may be provided with lower opening means to facilitate the cementing operation previously described, in a manner somewhat similar to that described in the aforesaid, Kliewier U.S. Pat. No. 3,503,217.

Thus, as shown in FIG. 4, body means 2301 of pile means 23, when in its installed position, will project axially of and through socket body means 2101.

An upper interior portion 2302 of pile means 23 may provide the selectively detachable, threaded-type connection 27 between the pile means 23 and a supporting or cementing string 26 in the manner previously noted.

In addition, the upper portion of pile body means 2301 may support a connecting sleeve 2303. Connecting sleeve 2303 may comprise an upwardly converging, frustoconical connection portion 2304. Associated with connecting portion 2304 is an annular and outwardly facing groove 2305, within which is disposed a snap-type fastening ring 2306.

The lower portion of connecting sleeve 2303 provides a downwardly converging, frustoconical outer surface 2307 operable to matingly engage interior surface 2102 of socket means 21. An annular groove 2308 associated with mounting surface means 2307 supports another snap ring 2309.

Each of the surfaces 2303 and 2307 and their associated grooves and snap rings may be provided in the form of a "Vetco Squnch Joint" now in common use in effecting offshore connections and available from Vetco Offshore Industries, Inc., 250 West Stanley Avenue, Ventura, California.

While the Vetco Squnch Joints shown in FIG. 4 are of the automatically, permanent latching type, it may also be possible to utilize modified Squnch Joints provided with hydraulic release mechanisms. Such mechanisms would facilitate disengagement of the pile means 23 from the socket means 21 and disengagement of the caisson means 36 from the pile means 23 for subsequent salvage operations.

Thus, connection of the pile means 23 to the socket means 21 is automatically effected by merely lowering the pile body 2301 through the socket aperture 2106 so as to bring the surface 2307 and 2102 into mating engagement and allow the snap ring 2309 to snap into locking engagement with the socket groove 2103.

With the piling thus latched to the gimbled socket portion 21 of the base means 18, the cementing of pile means 23 to submerged formation means 22 may proceed as earlier described. The selectively operable connection 27, described in connection with FIG. 1, may then be operated so as to release the pile "running in" and cementing string 26 from the pile body portion 2302.

PULLING HEAD STRUCTURE — DISTRIBUTION PIPELINES

Pulling head means 29 may comprise two different embodiments, each structured in accordance with the diverse characteristics of the pipeline means 3 and 4.

Thus, as shown in FIGS. 4 and 5, a pipeline pulling head means 2901 associated with pipeline means 401 may comprise an end portion 2902 of pipeline means 401. This pipeline end portion is operable to pass through socket passage 2818, as shown in FIG. 5, and terminate between socket means 2801 and caisson means 36.

A series of circumferentially spaced and generally radially extending web means 2903, as shown generally in FIGS. 5 and 6, project outwardly of pulling head portion 2902. These web means 2903 are operable to slidably engage the interior of wall means 2803 so as to center and socket pipeline means 2902 within socket means body portion 2803. The entry of supporting webs or fins 2903 into passage 2818 my be facilitated by beveled web edges 2904.

Abutment portions 2905 of web means 2903 are operable to engage inner portions 2811a of entry mouth 2811 so as to determine the ultimate socketed position of pulling head means 2901 within socket means 2801.

In this ultimate socketed position of the pulling head means 2902, generally semi-circular web recesses 2906 are disposed in generally median alignment with a plane passing perpendicularly of the axis of passage 2818 and generally symmetrically intersecting housing 2812.

Thus, in the ultimate socketed position of pulling head means 2902, one or possibly two of the web recess means 2906 will be disposed so as to be intersected by the locking pin 34 when it is inserted by a diver into the housing means 2812. As shown in FIG. 6, the locking pin 34 is disposed so as to intersect one such locking recess 2906. However, as will be appreciated, should pulling head means 2902 be somewhat rotated, pin means 34 would intersect two such web recess means 2906.

As will be further appreciated, the tensioning line 30 may be maintained under tension while the pin means 34 is being inserted into the housing means 2812 in order to latchingly secure the pulling head means 2902 to the socket means 2801.

As is also shown in FIGS. 4 and 5, pulling head means 2901 is provided with a conventional flange coupling 2907 at its terminus. A pipeline closing cap 2908 includes another flange coupling portion 2909 which is detachably coupled to flange portion 2907 by conventional threaded fasteners, not shown. A pulling bracket 2910 projects longitudinally of pipeline closing cap 2908 and is engageable with a hook portion 3001 of tension cable means 30 as generally depicted in FIG. 4.

Pipeline closing cap 2908 may also be provided with valve means 2911. This valve means is operable to control communication between the interior portion 2902 of pipeline means 401 and the ambient water body.

Thus, after the pipeline means 401 has been disposed in socketed position, as shown in FIG. 4, the hook 3001 may be detached from bracket means 2910, the sheave connection 3202 released, and the tensioning cable and guide sheave means relocated for a subsequent pipeline socketing operation (or removed to the platform as pipeline installation has been completed).

The cap 2908 may then be removed by disengaging the flange coupling portions 2907 and 2909. This may be accomplished by removing the conventional threaded fasteners which secure the peripheries of the flange elements 2907 and 2909. However, before the pipeline cap 2908 is removed, the diver or divers will operate the flooding valve 2911 so as to permit water to enter the interior of the pipeline means 401. This technique of flooding the interior of the pipeline means will permit the safe removal of the cap 2908. With the cap 2908 removed, the pipeline means 401 is disposed with the flange portion 2907 exposed and operable to be connected with a lower projecting portion of one of the riser means 45 of the caisson means 36.

Valve means 2911 may also be operated to flood the interior of pipeline means 401 and cap 2908 detached before the removal of cable means 30, sheave means 3202, etc. In this way, cable means 30 may be used to partially support cap 2908 while it is being removed from pulling head means 2901 and may be utilized to transport the separated cap 2908 to the platform means 11 for storage purposes.

PULLING HEAD STRUCTURE — FLOW LINES

FIGS. 9, 10, 11 and 12 schematically illustrate the structure of pulling heads 2912 which are associated with each of the dual flow line means 3.

As shown in FIG. 9, each pulling head means 2912 comprises terminal, conduit portions 2913 and 2914 of relatively small flow lines 301 and 302, respectively.

The terminal portions of flow lines 301 and 302 pass through, and are rigidly supported by a socketing, barrel portion 2915. Barrel portion 2915 is provided on its outer periphery with a camming sleeve 2916 which provides a camming edge 2917, shown generally in FIG. 9.

Camming edge 2917 may be defined by an edge aligned with a plane which is inclined relative to the longitudinal median axis of the barrel portion 2915 and the longitudinal axes of pipeline means 301 and 302. This plane may be generally perpendicular to a longitudinal upright plane which itself is perpendicular to a plane common to the longitudinal axes of pipeline means 301 and 302.

Camming edge 2917 includes, on a lower portion (in general alignment with a plane passing symmetrically between conduit portions 2913 and 2914 and extending perpendicular to the common plane of the longitudinal axes of pipelines 301 and 302), a locking, cam slot portion 2918.

Camming edge 2917 is rigidly mounted to pipeline means 301 and 302 by way of the rigidly connected components 2916, 2915, 2914 and 2913. Therefore, as pulling head 2912 is drawn through passage means 2819, the edge 2917 will be brought into camming cooperation with the follower or camming pin 2820. The camming cooperation between pin 2820 and edge 2917 will cause the pulling head 2912 to rotate about a central longitudinal axis of the pulling head, passing symmetrically between and parallel to the longitudinal axes of pipeline means 301 and 302, until the pin 2820 is brought into alignment with, and longitudinally enters, the longitudinally extending locking slot 2918.

With pin 2820 disposed in rotary position determining cooperation with slot 2918, the longitudinal axes of pipelines 301 and 302 will be disposed in general alignment with a plane extending parallel to the pivot axis of pivot means 2815, as generally shown in FIG. 11. Continued inward socketing movement of pulling head means 2912 may be continued until circumferentially spaced web means 2919 are brought into abutting engagement with an inner portion 2814a of entry mouth 2814 of socket means 2802.

With web means 2919 thus engaged with entry mouth means 2814, a latching pin 34 may be inserted by a diver into pin housing means 2817. Latching pin 34 will pass through housing means 2817 and project into passage 2819 so as to pass transversely through a cut-out, pin receiving, seat means 2920. Seat means 2920 may be defined by aligned, aperture edge portions of barrel means 2915 and sleeve means 2916. The configuration of pin seat defining edge means 2920 will be of the configuration formed by the transverse intersection of two cylindrical surfaces so as to permit the nested engagement of the cylindrical periphery of pin means 34 with edge means 2920.

As shown in FIG. 10, the interconnecting of the pipeline means 301 and 302 with each other and the pulling head may be facilitated by a framing arrangement wherein pipeline end portions 2913 and 2914 are rigidly connected with, and pass through, barrel sleeve means 2921 and 2922, respectively. Sleeve means 2921 and 2922 are interconnected with the interior of barrel means 2915 by way of reinforcing web means 2923.

The end of pipeline portion 2913 is provided with a half of conventional flange coupling 2924. Similarly, the end of pipeline portion 2914 is provided with another conventional, flange-type, coupling half 2925. A pulling bracket or nose 2926 is provided by a generally longitudinally extending, V-shaped plate means 2927. This plate means is connected through conduit means 2928 and 2929 with flange, half coupling portions 2930 and 2931, respectively, as shown in FIG. 9. Flange half coupling portions 2930 and 2931 are detachably secured with flange half coupling portions 2924 and 2925 by way of conventional threaded fastening means, not shown.

The entry of pulling nose 2926 into guide mouth 2814 may be facilitated by transverse, generally V-shaped guide plate means 2932 and 2933 which are mounted on and extend transversely of the edges of the V-shaped extremity of plate 2927.

As shown in FIGS. 9 and 11, a hook receiving socket 2934 may be provided in plate means 2927. This aperture means 2934 is engageable with hook means 3001 of tension cable means 30.

Each of the conduit means 2928 and 2929 may be provided with pipeline flooding means to permit the flooding of the interior of conduit means 301 and 302 before a diver disconnects flange coupling portions 2930 and 2931 from coupling portions 2924 and 2925.

Thus, as shown in FIG. 12, representative conduit means 2928 is provided with a pipeline end closing plate 2935 which is intersected by one or more flooding passage means 2936. Flow of ambient water through each passage means 2936 into the interior of conduit means portion 2930 and pipeline 301 may be controlled by a diver operated valve 2911, as previously noted, or by a conventional, diver removable, flooding plug 2937.

As has been earlier noted from the standpoint of diver safety, it is important to effect the flooding of the interior of conduit means 301 and 302 by operation of a flooding mechanism before the diver (or divers) attempt the removal of flange portions 2930 and 2931.

With flange portions 2930 and 2931 removed, the exposed flange coupling portions 2924 and 2925 are disposed between the axis of the caisson socket means 21 and the pipeline socket means 2802, generally facing toward the location of the later to be installed caisson means.

Caisson Means Including Internally Housed Riser Means

Structural details of installation 1 have now been described so as to provide structural information relating to installation sequence steps depicted in FIGS. 2a through 2h.

At this point, it is appropriate to consider structural details of the caisson means 36. Such structural details of this component of the overall installation are shown in FIGS. 7, 8, 13 and 14, as well as in sequence FIGS. 2i through 2l.

Caisson means 36 comprises a generally cylindrical body 3601. The length of body 3601 may be on the order of several hundred feet. In any event, the length of body means 3601 should be such as to ensure that the caisson means 36 extends from anchored engagement with base means 18, above the surface of water body 12, and into supported engagement with framing carried by platform means 11. It is also contemplated that an upper portion 3602 of riser means 36 will project through slot portion 17 of platform means 11 as shown generally in FIGS. 1 and 13.

Longitudinally spaced within the interior of body portion 3601 of riser means 36 may be a plurality of transversely extending, riser supporting bracket means 3603.

Each such bracket means 3603 is rigidly connected, as by welding, to the interior of body means 3601 and is provided with a plurality of riser receiving, longitudinally oriented passages 3604.

It is contemplated that each of the individual riser means 45 will extend telescopingly or relatively slidable through the caisson supporting passage means 3604 for stress relief purposes. If desired, this telescoping or slidable cooperation may be facilitated by the interpositioning of a sleeve or bushing 3605, in each passage means 3604 between the passage means wall and the exterior of the riser means 45. A bushing of this nature may be fabricated of yieldable, low friction material such as Teflon.

As will be understood, such a telescoping supporting arrangement will be provided in connection with each riser means 45. One riser means 45 will be provided within caisson means 36 for each of the individual flow lines 301 and 302 and each of the distribution lines 401.

The lower end of each riser means 45 is provided with a generally radially outwardly projecting portion 4501. Each such projecting lower portion 4501, which may be inclined somewhat downwardly, is rigidly anchored in the lower portion of the conduit means body 3601. This anchoring may be effected by a body of cementitious material or grout 3606, schematically depicted in FIG. 8. The body may be confined at its lower extremity by a transverse caisson wall 3607 which is welded to the interior of caisson body means 3601.

Each outwardly projecting riser portion 4501 may additionally be welded to caisson body means 3601 at a riser emergence juncture 3608.

The extremity of each projecting riser portion 4501 may be provided with a conventional half 4502 of a flange coupling. Similarly, the upper projecting extremity 4503 of each riser may be provided with a half 4504 of a conventional flange-type coupling.

Each flange half coupling 4502 is operable to be selectively connected, by diver operations, with a coupling means 46. Each flange half coupling 4504 is operable to be connected with a conduit means 48 on platform means 11 so as to provide communication between the riser means and an appropriate fitting on the fluid treating facility 2.

The lower portion of riser means 36 is provided with a connecting socket 3609. Socket 3609 provides an internal, downwardly and outwardly diverging frustoconical seat 3610. Seat 3610 also includes an annular locking ring receiving groove 3611.

With this arrangement, caisson means 36 may be lowered from platform means 11 until seat 3610 is brought into mating cooperation with upwardly facing frustoconical seat 2304 of the pile means 23. When this mating cooperating is effected, the snap ring 2306 will automatically move into latching engagement with recess or groove 3611 so as to latchingly engage the caisson means 36 with the base means 18 by way of the pile means 23. This mode of latching engagement is effected by the previously noted "Squnch Joint" structure, the illustrated components of which are available from Vetco Offshore Industries, Inc., 250 West Stanley Avenue, Ventura, California.

As will be recognized, the Squnch Joint structure may be modified so as to include a conventional hydraulic release feature, also available from Vetco Offshore Industries, Inc. Such an hydraulic release feature would facilitate salvaging of the installation at a later date by permitting the remotely induced separation of the caisson means 36 from the pile means 23.

Caisson means 36 and it various riser means 45 will be fabricated so that when the caisson means 36 is installed on the base means 18, the riser termini 4501 will be oriented so as to extend generally toward the socket means 28 which receive the pipeline means to be connected with the riser means. Similarly, the orientation of the upper riser termini 4503 will be prefabricated such that when the caisson means 36 is installed, the flange bearing portions 4504 of the termini 4503 will be oriented generally toward the desired positions of the connecting conduit means 48.

Bearing in mind these prefabrication criteria, the generally desired positioning of the caisson means 36 may be determined by an appropriate positioning of the guide line means 41. By appropriately locating guide line securing connections 42 (which may comprise conventional "pad eyes") on platform portion 1801 of base means 18 and by appropriately locating the guide line receiving sleeves 43 on the periphery of the caisson body 3601 as generally shown in FIG. 7, the guided lowering of the prefabricated caisson means 36 will tend to ensure the appropriate alignment of the riser means and their upper and lower termini when the caisson means is finally brought into latched engagement with pile means 23.

It is contemplated that this alignment may be further ensured by providing an upwardly converging aligning lug 3612 on connection component 2304, which lug is operable to camingly engage a downwardly diverging aligning slot 3613 formed on coupling portion 3609. Thus, should any slight misalignment exist between the caisson means 36 and the base means 18 during the lowering operation, camming cooperation lug 3612 and slot 3613 would tend to rotate caisson means 36 about its longitudinal axis into accurate and desired alignment during the ultimate latching movement of components 3609 and 2304.

It is also contemplated that caisson means 36 may be provided, in its interior, with a plurality of electrical and/or hydraulic and/or pneumatic conduits intended to be engaged with various subsea control installations. Such control conduits may be prefabricated so as to have whatever orientation is necessary to facilitate connection of the conduits with control connections on base means 18. Such control connections may comprise termini of flexible well control conduits carried by the conduit means 301 and/or 302. The control conduits carried by caisson means 36 may project outwardly of the lower portion of the caisson means toward preselected connection zones.

As was noted earlier in the discussion concerning method aspects of this invention, the caisson means 3601 may be longitudinally compartmented or otherwise provided with flooding or buoyancy adjusting means. Such flooding or buoyancy adjusting means, in a conventional manner, may be operated from barge 35 and/or by divers so as to progressively flood the lower portion of the caisson means, with the flooding progressing upwardly toward the upper terminus 40.

With the upper caisson terminus 40 supported, as for example by the barge derrick 35, the progressive flooding of the lower portion of the caisson 36 will cause the lower caisson end 39 to pivot downwardly relative to the generally fixed upper end 40, so as to rotate the caisson from a generally horizontal to a generally upright position.

Buoyancy control of this general nature, intended to facilitate the upright positioning of a structure to be connected with an offshore platform means and a submerged socket, is described for example in Marshall U.S. Pat. No 3,501,919.

Selectively Adjustable Misalignment Coupling Means

As will be apparent from the overall tenor of the foregoing discussion, this invention involves a fabrication technique which deliberately contemplates, and accommodates, misalignment between socketed pipeline means and other submerged fluid connections.

As has also been made apparent through the foregoing discussion, the connection between possibly misaligned components is effect without relying upon remote actuating means.

At this juncture, it becomes appropriate to consider structural and operational details of adjustable coupling means which may be employed to provide connections between the socketed pipeline means and the projecting lower ends 4501 of the riser 45.

One such selectively adjustable misalignment coupling means 4601, which may be utilized to connect a relatively larger diametered pipeline means 401 with a relatively larger diametered riser means 45, is illustrated in FIGS. 3, 7 and 8.

FIG. 7 depicts the coupling means 4601 being lowered to the vicinity of the submerged base means platform 1801. The hoisting gear cable means 47 performing the coupling lowering function, may comprise a bridle and/or cable means manipulated by winch means on platform 11, as earlier noted.

The hoisting and lowering cable means 47 may be operated so as to dispose the coupling means 4601 generally between the now exposed flange coupling half portions 2907 and 4502.

As shown in FIGS. 7 and 8, the longitudinal axes of flange couplings 2907 and 4502 may be vertically misaligned, vertically skewed and, indeed, may also be laterally misaligned or skewed.

With the coupling means 4601 positioned as generally shown in FIG. 7, one or more divers, operating with the benefit of control communication with the operator of hoisting cable means 47, may manipulate the selectively adjustable coupling means 4601 so as to interconnect the coupling means with flange means 2907 and 4502. In this manner, the coupling means 4601, when installed, would provide fluid communicating connection between pipeline means 401 and its associated riser means 45.

Coupling means 4601, as shown in FIGS. 3 and 8, may comprise telescoping or longitudinally extensible body portion 4602 corresponding to the structure shown, for example, in U.S. Arnold Pat. No. 3,393,926.

Telescoping body means 4602 thus may comprise mutually telescoped conduit components 4603 and 4604 operable to be selectively, telescopingly extended and locked in extended position. As is described in the aforesaid Arnold U.S. Pat. No. 3,393,926, this locking action may be accompanied by a grout-type sealing of the interlocked telescoping body portions 4603 and 4604.

At each end of telescoping body means 4602 a misalignment coupling 4605 may be provided. In the arrangement shown in FIG. 8, it is contemplated that the coupling means 4605 may comprise, for example, a Regan Pipeline Swivel (Type LS-1) available from Regan Forge and Engineering Company, San Pedro, California.

Each such misalignment coupling 4605, in essence, comprises a swivel connection. Each such swivel connection, at its outer end, supports a half 4606 of a conventional flange coupling. One such coupling half 4606 of one misalignment coupling 4605 is matingly engageable with exposed flange coupling 2907, while the other flange coupling half 4606 of the other coupling 4605 of adjustable coupling means 4602 is matingly engageable with exposed flange 4502. With the flange connections completed as shown in FIG. 8, pipeline 401 is disposed in fluid communicating relation with its associated riser means 45. By virtue of the universal-type adjustability of coupling components 4605, each of the flange means 4606 may be selectively oriented relative to the axis of body means 4603 so as to accommodate for misalignment between the longitudinal axes of pipeline means 401 and a riser portion 4501.

As is shown in FIG. 3, each of the socketed pipelines 301 and 302 may be connected with their respectively associated riser means 45 by virtue of a somewhat modified, selectively adjustable misalignment coupling means 4607. The riser means connected with pipelines 301 and 302 may have parallel, projecting lower ends 4501a and 4501b, as shown in FIG. 3.

Each of these misalignment coupling means 4607 may comprise a body portion 4608 of a telescoping nature corresponding to telescoping body 4602 previously discussed.

At each end of telescoping body portion 4608, a selectively adjustable, misalignment accommodating, union-type swiveled flange coupling 4609 may be located. Each such misalignment union flange coupling may comprise, for example, a Vetco Misalignment Union-type Coupling available from Vetco Offshore Industries, Inc., of Ventura, California. Flange half couplings 2924, 2925 and 4502 comprise mating elements of this type coupling.

By selectively extending the telescoping body portion 4608 and appropriately orienting one or both of the misalignment coupling means 4609, each coupling 4607 may be connected with an exposed flange means 4502 and either flange means 2924 or flange means 2925, depending upon whether a connection is being made with pipeline 301 or 302. As shown in FIG. 3, in order to facilitate installation, the misalignment couplings 4609 of unit 4607 associated with pipeline 301 may be longitudinally displaced from the couplings 4609 of pipeline 302.

With respect to either of the coupling means 4601 or the coupling means 4609, it is contemplated that installation may be effected by first attaching one misalignment coupling means to the flange means of either the pipeline or the exposed riser end. This flange connection may be made while the hoisting means is supporting the coupling, so as to facilitate diver manipulations.

After the diver has made the initial flange or union connection, the telescoping body portion of the coupling may be extended so as to bring the other flange of the coupling into engageable cooperation with the other one of the riser end and pipeline flanges. By appropriately manipulating one or more of the misalignment coupling components and telescoping body portions, this remaining flange may be connected so as to complete the overall coupling means installation.

Again during this phase of the installation, the coupling means may remain supported by the hoisting means so as to facilitate diver operations.

This installation procedure may be repeated from pipeline to pipeline, until all of the pipelines have been connected with their respectively associate riser means. Thereafter the hoisting means may be withdrawn to the surface.

Before, during, or after the installation of the pipeline coupling means, divers may interconnect the control conduits projecting from the lower end of the caisson means with either control stations on the base means 18 or control transmission lines which may be connected with the various pipelines.

In describing the conduit coupling means as being selectively adjustable, this terminology is utilized in a broad sense to accommodate relatively rigid couplings which would be fabricated by utilizing selectively adjustable conduit-shape determining, jig and template means. The fabrication of coupling means operable to accommodate misalignment of this nature is described for example in U.S. Patent application Ser. No. 835,647, filed June 23, 1969, designating William A. Morgan as inventor, entitled "Method and Apparatus for Connecting Pipelines," and assigned to the assignee of the present application. The disclosure of this Morgan U.S. application is hereby incorporated in its entirety by reference.

SUMMARY OF ADVANTAGES AND OVERALL SCOPE OF INVENTION

A principal advantage of the invention resides in the manner in which diver operations are integrated or blended with surface operations so as to conserve diver time, while virtually eliminating or minimizing reliance upon precision alignment of components and remote operators.

Other significant advantages of the invention reside in the ease of fabrication and installation of the system and in the provision of a uniquely simple, but effective, temporary or permanent facility. Significantly, the caisson facilitates the installation of several risers and does not impose support loads directly on the legs of the jack-up rig.

The operating and installation characteristics of the system are such as to permit it to be installed even under relatively adverse weather conditions.

The stress relieving characteristics of the popeline socketing means are believed to significantly contribute to minimization of pipeline and pipeline socket stress and damage, both during the installation phase and during the operational phase of the system. During the installation phase, the socket means may rotate about their stress relieving pivot axis so as to automatically accommodate for the orientation of the ends of the pipeline being pulled into socketed positions. After the installation has been completed, this stress relieving capability would persist, as would the stress relief provided by a flexible coupling 46.

The gimbled nature of the pile anchoring component of the base means enables the caisson means to be fabricated and installed in an upright position, even though the base means may be disposed in a canted or inclined position on a submerged surface.

Significantly, the invention departs from reliance upon submerged or buoyant well fluid treating installations of the type contemplated in prior art patents such as Koonce et al. U.S. Pat. No. 3,355,899, Corley, Jr. et al. U.S. Pat. No. 3,363,683 and McIntosh U.S. Pat. No. 3,366,173.

Of major importance is the manner in which the invention departs from the teaching of prior patents such as Haeber U.S. Pat No. 3,358,753. This Haeber patent discloses an underwater connection where a pipeline is first socketed and a remotely actuated telescoping joint then extended to complete a connection with a pipeline. Where this Haeber technique requires precision alignment and a remote actuator, the present invention eliminates such reliance and, in addition, in its preferred form, yields a unique stress relieving benefit.

It is to be recognized that prior patents such as Word, Jr. et al. U.S. Pat. No. 3,336,975 disclose pipeline sockets which are pivotally mounted for use in making underwater pipeline connections. However, the structure featured in this Word, Jr. et al. patent contemplates pivotal movement of a socket only to the extent necessary to move a socket from an upright pipeline receiving position to a downwardly inclined and fixed, installation position.

In short, the present invention constitutes a repudiation of teachings of patents such as those heretofore noted, and proceeds in a different direction which effectively integrates diver and surface operations so as to improve the efficiency and ease of offshore installation techniques.

In describing the invention, reference has been made to particular types and configurations of pipeline and pulling means, base means including base anchoring and pipeline socketing means, caisson and riser means, and coupling means. Obviously, advantages of the invention can be derived from systems using only some of these basic components and where components are changed both as to structure, installation, orientation, size, shape, numbers, and operating characteristics.

Thus, those skilled in the offshore art and familiar with the disclosure of this invention may well recognize additions, deletions, substitutions, changes in structure, configuration, size, number, orientation, type, and modes of installation and operation and other modifications which would fall within the purview of the invention as set forth in the appended claims.

What is claimed is:

1. A method of making an offshore installation, said method comprising:
   providing platform means, in an offshore area;
   providing platform stabilizing means engaging a submerged surface to generally stabilize said platform means in relation to a submerged location;
   positioning base means on said submerged surface and on said base means providing
      a plurality of proximity determining, pipeline socket means with each of said socket means including
      a pipeline means receiving passage;
   in relation to one of said pipeline socket means
      providing cable means extending, from one pipeline means supported on pipelaying vessel means, downwardly through a water body, into and through said one pipeline socket means, and upwardly to said platform means,
      exerting tension on said cable means, from said platform means, and thereby pulling said one pipeline means off of said pipelaying vessel means, downwardly through said water body, and into socketed engagement with said one pipeline socket means, and
   in relation to another of said pipeline socket means
      providing cable means extending from another pipeline means supported on pipelaying vessel means, downwardly through a water body, into and through said other pipeline socket means, and upwardly to said platform means,
      exerting tension on said cable means from said platform means and thereby pulling said other pipeline means off of said pipelaying vessel means, downwardly through said water body and into socketed engagement with said other pipeline socket means; and
   prior to the completion of said installation, and subsequent to the positioning of said base means, interconnecting caisson means with said base means, with said caisson means comprising
   body means, and
   a plurality of riser means extending longitudinally of and disposed within said body means,
   at least some of said riser means having a lower portion projecting transversely outwardly of a lower portion of said body means; and
   utilizing at least one diver, and with respect to said one and said other pipeline means socketed respectively, in said one and said other pipeline socket means,
   lowering through said water body a first coupling means,
   interconnecting said first coupling means with
      said one pipeline means socketed in said one pipeline socket means, and
      a projecting lower portion of one of said riser means,
   lowering through said water body a second coupling means, and
   interconnecting said second coupling means with
      said other pipeline means socketed in said other pipeline socket means, and
      a projecting lower portion of another of said riser means.

2. A method of making an offshore installation as described in claim 1 wherein:
   said base means is provided with a latching means gimbal-mounted thereon;
   said method further comprises the anchoring of said base means to submerged formation means by
      inserting pile means through said gimbal-mounted latching means into submerged formation means,
      latchingly engaging said pile means and said gimbal-mounted latching means, and
      anchoring said pile means to said submerged formation means;

said one and said other pipeline socket means are each provided with
stress relieving pivot mount means supporting said pipeline socket means for pivotal movement about a pipeline stress relieving pivot axis,
said stress relieving axis extends generally transversely of a longitudinal axis of said pipeline means receiving passage;
said method further comprises the effecting of said socketed engagement between said one pipeline means and said one pipeline socket means while the pivot means of said one pipeline socket means is operable to permit said one pipeline socket means to undergo pipeline and socket means, stress relieving, pivotal movement; and
said method further comprises the effecting of said socketed engagement between said other pipeline means and said other pipeline socket means while the pivot mount means of said other pipeline socket means is operable to permit said other pipeline socket means to undergo pipeline and socket means, stress relieving, pivotal movement.

3. A method of making an offshore installation as described in claim 1 wherein:
said first coupling means includes
first telescoping joint means and
first misalignment coupling means;
said interconnecting of said first coupling means with said one pipeline means and said projecting lower portion of said one of said riser means is effected by at least one diver manipulating said first telescoping joint means and said first misalignment coupling means;
said second coupling means includes
second telescoping joint means and
second misalignment coupling means;
said interconnecting of said second coupling means with said other pipeline means and said projecting lower portion of said other of said riser means is effected by at least one diver manipulating said second telescoping joint means and said second misalignment coupling means.

4. A method of making an offshore installation, said method comprising:
positioning platform means, in a offshore area;
providing platform stabilizing means engaging a submerged surface to generally stabilize said platform means in relation to a submerged location;
providing base means and lowering said base means into engagement with said submerged surface;
from said platform means, drilling through an opening on said base means, said drilling providing a pile-receiving cavity in submerged formation means;
from said platform means, lowering pile means into said pile-receiving cavity;
interconnecting said pile means with said base means; anchoring said pile means to said submerged formation means and thereby anchoring said base means to said submerged formation means;
providing, on said anchored base means, a plurality of proximity determining, pipeline socket means with each of said socket means
including a pipeline means receiving passage, being anchored to said submerged formation means through said base means and pile means, and
being pivotally supported for movement about a pipeline stress relieving, pivot axis extending generally transversely of a longitudinal axis of said pipeline receiving passage;
in relation to one of said pipeline socket means
providing cable means extending, from one pipeline means supported on pipelaying vessel means, downwardly through a water body, into and through said one pipeline socket means, and then upwardly to said platform means
exerting tension on said cable means, from said platform means, and thereby pulling said one pipeline means off of said pipelaying vessel means, downwardly through said water body, and into socketed engagement with said one pipeline socket means, while concurrently permitting said one socket means to pivot about its stress relieving pivot axis;
in relation to another of said pipeline socket means
providing cable means extending from another pipeline means supported on pipelaying vessel means, downwardly through a water body, into and through said other pipeline socket means, and then upwardly to said platform means
exerting tension on said cable means from said platform means and thereby pulling said other pipeline means off of said pipelaying vessel means, downwardly through said water body and into socketed engagement with said other pipeline socket means, while concurrently permitting said other socket means to pivot about its stress relieving pivot axis;
prior to the completion of said installation, and subsequent to the positioning of said base means, interconnecting caisson means with said base means, with said caisson means comprising
body means, and
a plurality of riser means extending longitudinally of and disposed within said body means,
each riser means having a lower portion projecting transversely outwardly of a lower portion of said body means;
said interconnecting of said caisson means and said base means being effected by
buoyantly supporting and transporting said caisson means to the vicinity of said platform means,
lowering said caisson means downwardly toward said base means, and
interengaging said caisson means with said base means, with each of said lower portions of said riser means projecting generally toward a pipeline means socketed in a pipeline socket means; and
utilizing at least one diver, and with respect to said one and said other pipeline means socketed respectively, in said one and said other pipeline socket means,
lowering through said water body a first selectively adjustable coupling means comprising
first misalignment coupling means
interconnecting said first adjustable coupling means with said one pipeline means socketed in said one pipeline socket means, and a projecting lower portion of one of said riser means;

lowering through said water body a second, selectively adjustable coupling means comprising misalignment coupling means, and interconnecting second adjustable coupling means with said other pipeline means socketed in said other pipeline socket means, and a projecting lower portion of another of said riser means.

5. A method of making an offshore installation, said method comprising:

positioning a floating vessel, provided with platform means, in an offshore area;

lowering submerged surface engaging, platform stabilizing means from said floating vessel means and engaging a submerged surface therewith to generally stabilize said platform means in relation to a submerged location;

positioning base means generally adjacent and beneath said platform means while bouyantly supporting said base means;

supporting said base means from said platform means while lowering said base means into engagement with said submerged surface;

from said platform means, drilling through an opening in a latching means which is gimbal-mounted on said base means, said drilling providing a pile-receiving cavity in submerged formation means;

from said platform means, lowering pile means into said pile-receiving cavity;

latchingly interconnecting said pile means with said latching means which is gimbal-mounted on said base means;

from said platform means, directing cementitious material downwardly through said pile means and into said cavity;

allowing said cementitious material to harden and anchor said pile means to said submerged formation means and thereby anchor said base means to said submerged formation means;

providing, on said anchored base means, a plurality of proximity determining, pipeline socket means with each of said socket means including a pipeline means receiving passage, being anchored to said submerged formation means through said base means and pile means, and being pivotally supported for movement about a pipeline stress relieving, pivot axis extending generally transversely of a longitudinal axis of said pipeline receiving passage;

in relation to one of said pipeline socket means providing cable means extending, from one pipeline means supported on pipelaying vessel means, downwardly through a water body, into and through said one pipeline socket means, and then upwardly to said platform means, exerting tension on said cable means, from said platform means, and thereby pulling said one pipeline means off of said pipelaying vessel means, downwardly through said water body, and into socketed engagement with said one pipeline socket means, while concurrently permitting said one socket means to pivot about its stress relieving pivot axis, and utilizing at least one diver to latchingly secure said socketed one pipeline means to said one pipeline socket means;

in relation to another of said pipeline socket means providing cable means extending from another pipeline means supported on pipelaying vessel means, downwardly through a water body, into and through said other pipeline socket means, and then upwardly to said platform means exerting tension on said cable means from said platform means and thereby pulling said other pipeline means off of said pipelaying vessel means, downwardly through said water body and into socketed engagement with said other pipeline socket means, while concurrently permitting said other socket means to pivot about its stress relieving pivot axis, and utilizing at least one diver to latchingly secure said socketed other pipeline means to said other pipeline socket means;

prior to the completion of said installation, and subsequent to the positioning of said base means, interconnecting caisson means with said base means, with said caisson means comprising body means, and a plurality of riser means extending longitudinally of and disposed within said body means, each riser means having a lower portion projecting transversely outwardly of a lower portion of said body means;

said interconnecting of said caisson means and said base means being effected by bouyantly supporting and transporting said caisson means to the vicinity of said platform means, orienting said caisson means in a generally upright posture with the lower portion thereof submerged, supporting said caisson means from said platform means, lowering said caisson means from said platform means downwardly toward said base means while maintaining said caisson means in guided cooperation with guide means extending between said platform means and said base means, latchingly interengaging said caisson means with said base means, with each of said lower portions of said riser means projecting generally toward a pipeline means socketed in a pipeline socket means;

utilizing at least one diver, and with respect to said one and said other pipeline means socketed respectively, in said one and said other pipeline socket means, lowering through said water body a first selectively adjustable coupling means comprising first telescoping joint means and a first pair of misalignment coupling means, one of said misalignment coupling means of said first pair being disposed at each end of said first telescoping joint means, interconnecting one of said misalignment coupling means of said first pair with said one pipeline means socketed in said one pipeline socket means, and interconnecting the other of said misalignment coupling means of said first pair with a projecting lower portion of one of said riser means;

lowering through said water body a second, selectively adjustable coupling means comprising a second telescoping joint means and a second pair of misalignment coupling means, one of said misalignment coupling means of said second pair being disposed at each end of said second telescoping joint means, interconnecting one of said misalignment coupling means of said second pair with said other pipeline means socketed in said other pipeline socket means, and interconnecting the other of said misalignment coupling means of said second pair with a projecting lower portion of another of said riser means;

prior to the completion of said installation, and subsequent to the interconnecting of said caisson means and said base means, interconnecting an upper portion of said other of said riser means with well fluid treating equipment, which equipment is connected with said platform means, said other of said riser means being operable to receive well fluid to said other pipeline means, and interconnecting an upper portion of said one of said riser means with said well fluid treating equipment, with said one pipeline means being operable to receive treated well fluid from said one riser means and said well fluid treating equipment, 6. A method as described in claim 5:

wherein said other pipeline means includes a plurality of interconnected and generally parallel pipelines;

wherein said other pipeline socket means includes first rotary positioning means;

wherein said other pipeline means includes second, rotary positioning means operable to cooperate with said first, rotary positioning means, in response to socketing engagement of said other pipeline means with said other pipeline socket means to induce rotation of said other pipeline means about a longitudinally extending, median axis thereof and secure said other pipeline means in a predetermined rotary position relative to said other socket means;

wherein said second coupling means interconnects one pipeline of said plurality of pipelines of said other pipeline means with one riser of said other riser means;

wherein said method further comprises lowering through said water body a third, selectively adjustable coupling means including third telescoping joint means, and a third pair of misalignment coupling means, one of said misaligning coupling means of said third pair being disposed at each end of said third telescoping joint means, interconnecting one of said misalignment coupling means of said third pair with another pipeline of said plurality of pipelines of said other pipeline means, interconnecting the other of said misalignment coupling means of said third pair with a projecting lower portion of another riser of said other riser means; and wherein said second and third coupling means are disposed with said third pair of misalignment coupling means being longitudinally displaced from said second pair of misalignment coupling means along said longitudinal axis of said other pipeline means.

7. Apparatus for making an offshore installation, said apparatus comprising:

platform means located in an offshore area;

platform stabilizing means engaging a submerged surface to generally stabilize said platform means in relation to a submerged location;

base means engaged with said submerged surface;

a plurality of proximity determining, pipeline socket means located on said base means, with each of said socket means including a pipeline means receiving passage, one pipeline means disposed in socketed engagement with one pipeline socket means;

another pipeline means disposed in socketed engagement with another pipeline socket means;

caisson means including body means, and a plurality of riser means extending longitudinally of and disposed within said body means, each riser means having a lower portion projecting transversely outwardly of a lower portion of said body means;

means interengaging said caisson means with said base means;

a first diver-manipulated coupling means connected with said one pipeline means socketed in said one pipeline socket means, and a projecting lower portion of one of said riser means; and a second, diver-manipulated coupling means connected with said other pipeline means socketed in said other pipeline socket means, and a projecting lower portion of another of said riser means.

8. Apparatus for making an offshore installation as described in claim 7 wherein:

said apparatus includes a latching means gimbal-mounted on said base means, pile means inserted through said gimbal-mounted latching means into submerged formation means, means latchingly engaging said pile means and said gimbal-mounted latching means, and means anchoring said pile means to said submerged formation means; and said one and said other pipeline socket means each include stress relieving pivot mount means supporting said pipeline socket means for pivotal movement about a pipeline and socket means, stress relieving pivot axis, said stress relieving axis extending generally transversely of a longitudinal axis of said pipeline means receiving passage.

9. Apparatus for making an offshore installation as described in claim 7 wherein:
said first coupling means includes
first telescoping joint means and
first misalignment coupling means; and
said second coupling means includes
second telescoping joint means and
second misalignment coupling means.

10. Apparatus for making an offshore installation, said apparatus comprising:
platform means located in an offshore area;
platform stabilizing means engaging a submerged surface to generally stabilize said platform means in relation to a submerged location;
base means engaged with said submerged surface;
pile means connected with said base means and anchored to said submerged formation means;
a plurality of proximity determining, pipeline socket means located on said base means, with each of said socket means
including a pipeline means receiving passage,
being anchored to said submerged formation means through said base means and pile means, and
being pivotally supported for movement about a pipeline means stress relieving, pivot axis extending generally transversely of a longitudinal axis of said pipeline means receiving passage;
one pipeline means disposed in socketed engagement with one pipeline socket means, with said one socket means being operable to pivot about its stress relieving pivot axis, and
another pipeline means disposed in socketed engagement with another pipeline socket means, with said other socket means being operable to pivot about its stress relieving pivot axis;
caisson means including
body means, and
a plurality of riser means extending longitudinally of and disposed within said body means,
each riser means having a lower portion projecting transversely outwardly of a lower portion of said body means;
means interengaging said caisson means with said base means, with each of said lower portions of said riser means projecting generally toward a pipeline means socketed in a pipeline socket means;
a first selectively adjustable coupling means comprising
first misalignment coupling means,
said first, adjustable coupling means being connected with
said one pipeline means socketed in said one pipeline socket means, and
a projecting lower portion of one of said riser means; and
a second, selectively adjustable coupling means including
a second misalignment coupling means,
said second adjustable coupling means being connected with
said other pipeline means socketed in said other pipeline socket means, and
a projecting lower portion of another of said riser means.

11. Apparatus for making an offshore installation, said apparatus comprising:
a floatable vessel means, provided with platform means, and located in an offshore area;
submerged surface engaging, platform stabilizing means carried by said floatable vessel means and engaging a submerged surface to generally stabilize said platform means in relation to a submerged location;
base means engaged with said submerged surface;
latching means, gimbal-mounted on said base means;
pile means latchingly interconnected with said latching means and anchored to said submerged formation means;
a plurality of proximity determining, pipeline socket means located on said base means, with each of said socket means
including a pipeline means receiving passage,
being anchored to said submerged formation means through said base means and pile means, and
being pivotally supported for movement about a pipeline means stress relieving, pivot axis extending generally transversely of a longitudinal axis of said pipeline means receiving passage;
one pipeline means disposed in socketed engagement with one pipeline socket means, with said one socket means being operable to pivot about its stress relieving pivot axis, and
first, diver operated latching means latchingly securing said socketed one pipeline means to said one pipeline socket means;
another pipeline means disposed in socketed engagement with another pipeline socket means, with said other socket means being operable to pivot about its stress relieving pivot axis;
second, diver operated latching means latchingly securing said socketed other pipeline means to said other pipeline socket means;
caisson means including
body means, and
a plurality of riser means extending longitudinally of and disposed within said body means,
each riser means having a lower portion projecting transversely outwardly of a lower portion of said body means;
means latchingly interengaging said caisson means with said base means, with each of said lower portions of said riser means projecting generally toward a pipeline means socketed in a pipeline socket means;
a first selectively adjustable coupling means comprising
first telescoping joint means, and
a first pair of misalignment coupling means,
one of said misalignment coupling means of said first pair being disposed at each end of said first telescoping joint means,
one of said misalignment coupling means of said first pair being connected with
said one pipeline means socketed in said one pipeline socket means, and
the other of said misalignment coupling means of said first pair being connected with a projecting lower portion of one of said riser means;
a second, selectively adjustable coupling means including
a second telescoping joint means, and
a second pair of misalignment coupling means,
one of said misalignment coupling means of said second pair being disposed at each end of said second telescoping joint means,
one of said misalignment coupling means of said second pair being connected with
said other pipeline means socketed in said other pipeline socket means,
the other of said misalignment coupling means of said second pair being connected with
a projecting lower portion of another of said riser means;
means interconnecting an upper portion of said other of said riser means with well fluid treating equipment which is connected with said platform means, said other of said riser means being operable to receive well fluid from said other pipeline; and
means interconnecting an upper portion of said one of said riser means with said well fluid treating equipment, with said one pipeline being operable to receive treated well fluid from said well fluid treating equipment transmitted thereto by said other pipeline.

12. An apparatus as described in claim 11:
wherein said other pipeline means includes a plurality of interconnected and generally parallel pipelines;
wherein said other pipeline socket means includes first rotary positioning means;
wherein said other pipeline means includes second, rotary positioning means operable to cooperate with said first, rotary positioning means, in response to socketing engagement of said other pipeline means with said other pipeline socket means, to induce rotation of said other pipeline means about a longitudinally extending, median axis thereof and secure said other pipeline means in a predetermined rotary position relative to said other socket means;
wherein said second coupling means interconnects one pipeline of said plurality of pipelines of said other pipeline means with one riser of said other riser means;
wherein said apparatus includes a third, selectively adjustable coupling means comprising
third telescoping joint means, and
a third pair of misalignment coupling means,
one of said misaligning coupling means of said third pair being disposed at each end of said third telescoping joint means,
one of said misalignment coupling means of said third pair being connected with
another pipeline of said plurality of pipelines of said other pipeline means,
the other of said misalignment coupling means of said third pair being connected with
a projecting lower portion of another riser of said other riser means; and said second and third coupling means being disposed with said third pair of misalignment coupling means longitudinally displaced from said second pair of misalignment coupling means along said longitudinal axis of said other pipeline means.

13. A method of making an offshore installation, said method comprising:
providing platform means, in an offshore area;
providing platform stabilizing means engaging a submerged surface to generally stabilize said platform means in relation to a submerged location;
positioning base means on said submerged surface and on said base means providing
proximity determining, pipeline socket means including
a pipeline means receiving passage,
providing cable means extending, from pipeline means supported on pipelaying vessel means, downwardly through a water body, into and through said pipeline socket means, and upwardly to said platform means,
exerting tension on said cable means, from said platform means, and thereby pulling said pipeline means off of said pipelaying vessel means, downwardly through said water body, and into socketed engagement with said pipeline socket means;
prior to the completion of said installation, and subsequent to the positioning of said base means interconnecting riser with said base means; and
utilizing at least one diver, and with respect to said pipeline means socketed in said pipeline socket means,
lowering through said water body a selectively adjustable coupling means comprising
telescoping joint means and
misalignment coupling means
interconnecting said adjustable coupling means with
said pipeline means socketed in said one pipeline socket means, and
a lower portion of said riser means.

14. Apparatus for making an offshore installation, said apparatus comprising:
platform means located in an offshore area;
platform stabilizing means carried by said platform means and engaging a submerged surface to generally stabilize said platform means in relation to a submerged location;
base means engaged with said submerged surface generally adjacent said platform stabilizing means;
proximity determining, pipeline socket means located on said base means and including
a pipeline means receiving passage;
pipeline means disposed in socketed engagement with pipeline socket means;
riser means connected with said base means extending upwardly thereof and disposed generally adjacent said platform means; and
selectively adjustable coupling means comprising
telescoping joint means, and
misalignment coupling means;
said adjustable coupling means being connected with
said pipeline means socketed in said pipeline socket means, and
a lower portion of said riser means.

15. In an apparatus for making an offshore installation which includes
base means engaged with a submerged surface;
installation means operable to be connected with said base means on said submerged surface;
pipeline socket means located on said base means; and
receiving passage means included in said socket means and operable to socketingly receive pipeline means
the improvement characterized by:
stress relieving pivot means operable to pivotally support said pipeline socket means for stress relieving pivotal movement while a pipeline means is being socketingly received by said receiving passage means and while said receiving passage means extends generally laterally of said base means;
means for drawing pipeline means laterally toward said base means and into socketed engagement with said receiving passage means while said socket means is free to undergo said pivotal movement; and
misalignment accommodating coupling means operable to effect a coupling between non-axially aligned portions of said pipeline means, as socketingly received by said receiving passage means, and said installation means.

16. An apparatus for making an offshore installation as described in claim 15 characterized in that:
said apparatus includes
platform means located in an offshore area;
platform stabilizing means engaging a submerged surface to generally stabilize said platform means in relation to a submerged location;
said pipeline socket means includes
a plurality of proximity determining, pipeline sockets located on said base means;
said pipeline means includes
one pipeline means disposed in socketed engagement with one pipeline socket, and
another pipeline means disposed in socketed engagement with another pipeline socket;
said installation means comprises caisson means including
body means, and
a plurality of riser means extending longitudinally of and disposed within said body means,
each riser means having a lower portion projecting transversely outwardly of a lower portion of said body means; and
said misalignment accommodating coupling means includes
a first, diver-manipulated misalignment accommodating coupling connected with
one pipeline socketed in one pipeline socket, and
a projecting lower portion of one of said riser means; and
a second, diver-manipulated misalignment accommodating coupling connected with
another pipeline means socketed in another pipeline socket, and
a projecting lower portion of another of said riser means.

17. An apparatus for making an offshore installation as described in claim 15 further characterized in that:
said stress relieving pivot means includes means pivotally supporting said receiving passage means for pivoted movement about pipeline stress relieving, pivot axis means extending generally transversely of said receiving passage means; and
said pipeline means is socketingly received in said receiving passage means, with said receiving passage means being operable to pivot about said stress relieving pivot axis means.

18. An apparatus for making an offshore installation as described in claim 15 further characterized in that said misalignment accommodating coupling means includes:
telescoping joint means;
first misalignment coupling means operable to be connected between one end of said telescoping joint means and said pipeline means; and
second misalignment coupling means operable to be connected between another end of said telescoping joint means and said installation means.

19. An apparatus as described in claim 15 further characterized in that:
said pipeline means includes a composite pipeline assembly comprising a plurality of interconnected and generally parallel pipelines;
said pipeline socket means includes first rotary positioning means; and
said composite assembly includes second, rotary positioning means operable to cooperate with said first, rotary positioning means, in response to socketing engagement of said composite assembly with said receiving passage means, to induce rotation of said composite assembly about a longitudinally extending, median axis thereof and secure said composite assembly in a predetermined rotary position relative to said pipeline socket means.

20. In a method for making an offshore installation which includes
installing a base means at an offshore location engaged with a submerged surface;
providing installation means connected with said base means on said submerged surface;
providing pipeline socket means located on said base means; and
including pipeline means receiving passage means in said socket means;
the improvement characterized by:
pivotally supporting said pipeline socket means for stress relieving pivotal movement while a pipeline means is being received by said receiving passage means and while said receiving passage means extends generally laterally of said base means;
drawing pipeline means laterally toward said base means and into socketed engagement with said receiving passage means while said socket means is free to undergo said pivotal movement; and
effecting a misalignment accommodating coupling between non-axially aligned portions of said pipeline means, as socketingly received by said receiving passage means, and said installation means.

21. A method of making an offshore installation as described in claim 20 further characterized by:
providing platform means, in an offshore area;
providing platform stabilizing means engaging a submerged surface to generally stabilize said platform means in relation to a submerged location;

providing in said pipeline socket means
a plurality of proximity determining pipeline sockets, each including
a said pipeline means receiving passage, and
a stress relieving pivot means;
in relation to one of said pipeline sockets, effecting said lateral drawing of pipeline means by
providing cable means extending, from one pipeline means supported on pipelaying vessel means, downwardly through a water body, into and through a receiving passage of said one pipeline socket, and upwardly to said platform means,
exerting tension on said cable means, from said platform means, and thereby pulling said one pipeline means off of said pipelaying vessel means, downwardly through said water body, and into socketed engagement with said receiving passage of said one pipeline socket, and
in relation to another of said pipeline sockets effecting said lateral drawing of pipeline means by
providing cable means extending from another pipeline means supported on pipelaying vessel means, downwardly through a water body, into and through a receiving passage of said other pipeline socket, and upwardly to said platform means,
exerting tension on said cable means from said platform means and thereby pulling said other pipeline means off of said pipelaying vessel means, downwardly through said water body and into socketed engagement with said receiving passage of said other pipeline socket; and
prior to the completion of said installation, and subsequent to the positioning of said base means, interconnecting installation means comprising a caisson with said base means, with said caisson comprising:
body means, and
a plurality of riser means extending longitudinally of and disposed within said body means,
at least some of said riser means having a lower portion projecting transversely outwardly of a lower portion of said body means; and
utilizing at least one diver, and with respect to said one and said other pipeline means socketed respectively, in said one and said other pipeline sockets,
lowering through said water body a first misalignment accommodating coupling of said coupling means,
interconnecting said first misalignment accommodating coupling with
said one pipeline means socketed in said one pipeline socket, and
a projecting lower portion of one of said riser means,
lowering through said water body a second misalignment accommodating coupling of said coupling means, and
interconnecting said second misalignment accommodating coupling with
said other pipeline means socketed in said other pipeline socket, and
a projecting lower portion of another of said riser means.

22. A method for making an offshore installation as described in claim 20 further characterized by:
effecting said pivotal supporting of said pipeline socket means, with means pivotally supporting said receiving passage means for pivotal movement about pipeline stress relieving, pivot axis means extending generally transversely of said receiving passage means; and
disposing said pipeline means in socketed engagement with said receiving passage means being operable to pivot about said stress relieving pivot axis means.

23. A method for making an offshore installation as described in claim 20 further characterized in that said misalignment accommodating coupling is effected by
locating telescoping joint means between said pipeline means and said installation means;
connecting first misalignment coupling means between one end of said telescoping joint means and said pipeline means; and
connecting second misalignment coupling means between another end of said telescoping joint means and said installation means.

24. A method as described in claim 20 further characterized by:
including in said pipeline means a composite pipeline assembly comprising a plurality of interconnected and generally parallel pipelines;
including in said pipeline socket means first rotary positioning means;
including in said composite assembly second, rotary positioning means;
in response to socketing engagement of said composite assembly with said receiving passage means causing said second rotary positioning means to engage said first rotary positioning means to induce rotation of said composite assembly about a longitudinally extending, median axis thereof and secure said composite assembly in a predetermined rotary position relative to said pipeline socket means.

* * * * *